(12) United States Patent
Ohta et al.

(10) Patent No.: US 9,191,933 B2
(45) Date of Patent: *Nov. 17, 2015

(54) TIMING ADJUSTMENT METHOD IN A MOBILE COMMUNICATION SYSTEM THAT PERFORMS AN ADJUSTMENT OF UPLINK TRANSMISSION TIMING BY RANDOM ACCESS BETWEEN A USER EQUIPMENT AND A BASE STATION

(71) Applicant: FUJITSU LIMITED, Kawasaki, Kanagawa (JP)

(72) Inventors: Yoshiaki Ohta, Kawasaki (JP); Yoshiharu Tajima, Kawasaki (JP); Yutaka Kobayashi, Kawasaki (JP); Kazuhisa Obuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 52 days.

This patent is subject to a terminal disclaimer.

(21) Appl. No.: 13/736,719

(22) Filed: Jan. 8, 2013

(65) Prior Publication Data

US 2013/0121254 A1    May 16, 2013

Related U.S. Application Data

(60) Division of application No. 12/957,478, filed on Dec. 1, 2010, now Pat. No. 8,787,956, which is a continuation of application No. PCT/JP2008/060151, filed on Jun. 2, 2008.

(51) Int. Cl.
| | |
|---|---|
| *H04B 7/00* | (2006.01) |
| *H04W 72/04* | (2009.01) |
| *H04W 56/00* | (2009.01) |
| *H04W 76/02* | (2009.01) |

(52) U.S. Cl.
CPC ...... *H04W 72/0413* (2013.01); *H04W 56/0045* (2013.01); *H04W 72/044* (2013.01); *H04W 76/02* (2013.01)

(58) Field of Classification Search
CPC .... H04B 3/238; H04B 1/7115; H04B 1/7087; H04B 7/2668; H04B 1/7117; H04B 17/364; H04B 1/707; H04B 1/70735; H04B 1/70755; H04B 1/708; H04B 1/7083; H04B 1/7113; H04B 2201/709709; H04B 7/08; H04B 7/2681; H04B 14/008; H04B 1/04; H04B 1/0475; H04B 1/1027; H04B 1/07; H04W 28/04; H04W 74/008; H04W 36/08; H04W 72/00; H04W 74/002; H04W 56/00; H04W 48/16; H04W 56/0045; H04W 74/0866; H04W 56/0005; H04W 56/001; H04W 92/10; H04W 12/10; H04W 24/00; H04W 36/06; H04W 56/0015; H04W 56/0075; H04W 74/0891; H04W 88/08; H04J 3/0682; H04J 13/004; H04J 13/10; H04J 3/0638; H04J 13/00; H04J 13/16; H04J 47/007; H04J 3/0602; H04J 3/0608; H04J 3/0632; H04J 2203/0089; H04J 3/0605; H04J 3/0647; H04J 3/0676; H04J 3/0685
USPC ......... 370/229, 230, 232, 233, 235, 242, 252, 370/310, 311, 328–330, 332, 335, 336, 342, 370/350, 401, 412, 450, 471, 516; 455/114.2, 296, 406, 422.1, 434, 455/435.1, 436–438, 445, 452.1, 508
See application file for complete search history.

(56) References Cited

U.S. PATENT DOCUMENTS

| | | | |
|---|---|---|---|
| 8,218,526 | B2 | 7/2012 | Bertrand et al. |
| 2007/0293157 | A1 | 12/2007 | Haartsen et al. |
| 2008/0085715 | A1 | 4/2008 | Alm et al. |
| 2008/0267165 | A1 | 10/2008 | Bertrand et al. |
| 2008/0310396 | A1* | 12/2008 | Park et al. ............... 370/350 |
| 2009/0141700 | A1 | 6/2009 | Baldemair et al. |
| 2009/0196208 | A1 | 8/2009 | Yu et al. |
| 2009/0279495 | A1 | 11/2009 | Yoo |
| 2010/0279695 | A1 | 11/2010 | Amirijoo et al. |
| 2013/0308615 | A1 | 11/2013 | Baldemair et al. |

FOREIGN PATENT DOCUMENTS

| CN | 1581871 | 2/2005 |
|---|---|---|
| CN | 1957545 | 5/2007 |
| JP | 2009-513044 | 3/2009 |

OTHER PUBLICATIONS

Ericsson: "Handling of Timing Advance during RA", 3GPP DRAFT; R2-082736, vol. RAN WG2, May 9, 2008.*
Notice of Rejection issued for corresponding Japanese patent application No. 2012-229338, dispatched Oct. 1, 2013, with English translation.
NEC; "Resource handling during persistent scheduling"; Agenda Item: 5.1.1.10 Other (unicast); 3GPP TSG-RAN WG2 Meeting #61bis; R2-081668; Shenzhen, China; Mar. 31-Apr. 4, 2008.
Non-Final Office Action issued by the United States Patent and Trademark Office for corresponding U.S. Appl. No. 13/736,712, electronically delivered Mar. 4, 2014.
Non-Final Office Action issued by the United States Patent and Trademark Office for corresponding U.S. Appl. No. 12/957,478, electronically delivered Aug. 8, 2013.
Notice of Rejection issued for corresponding Japanese patent application No. 2012-229337, dispatched Oct. 1, 2013, with English translation.
3GPP TS 36.321 V8.1.0; 3rd Generation Partnership Project; Technical Specification Group Radio Access Network; "Evolved Universal Terrestrial Radio Access (E-UTRA) Medium Access Control (MAC) protocol specification"; (Release 8); dated Mar. 2008; [URL: http://www.3gpp.org/ftp/Specs/html-info/36321.htm].
Fujitsu; "TA Timer Handling in Msg2"; Agenda item: 5.1.1.6 (Random Access Procedure); Document for: Discussion and Decision; R2-082221; 3GPP TSG RAN WG2 Meeting #62; Kansas City, USA, May 5-9, 2008, p. 1-4 [Ref.: ISR, mailed Aug. 19, 2008].
Nokia Corporation, Nokia Siemens Networks; Agenda item: 5.1.1.6; "On timing advance commands and synchronization status"; Document for: Discussion and Decision; R2-082435; 3GPP TSG-RAN WG2 Meeting #62, Kansas City, USA, May 5-9, 2008, p. 1-3 [Ref.: ISR, mailed Aug. 19, 2008].
Nokia Corporation, Nokia Siemens Networks; Agenda item: 5.1.1. 10; "Editorial Updates to 36.321"; Document for: Discussion and Decision; R2-082201; 3GPP TSG-RAN WG2 Meeting #62, Kansas City, USA, May 5-9, 2008; p. 1-25 [Ref.: ISR, mailed Aug. 19, 2008].
International Search Report issued for corresponding International Application No. PCT/JP2008/060151, mailed Aug. 19, 2008.
Non-Final Office Action issued by the United States Patent and Trademark Office for corresponding U.S. Appl. No. 12/957,478 electronically mailed Sep. 26, 2012.
Ericsson: "Handling of Timing Advance during RA"; Agenda Item 5.1.1.6; TSG-RAN WG2 Meeting #62; R2-082736 (updated R2-082403); Kansas City, USA; May 5-9, 2008.
3GPP: "Evolved Universal Terrestrial Radio Access (E-UTRA) Medium Access Control (MAC) protocol specification (Release 8)"; 3GPP TS 36.321 V8.2.0; May 2008.
Extended European search report with European search opinion issued for corresponding European Patent Application No. 08777102.8 dated Mar. 21, 2012.
Final Office Action issued by the United States Patent and Trademark Office for corresponding U.S. Appl. No. 12/957,478, electronically delivered Dec. 24, 2013.
First Notification of Office Action issued for corresponding Chinese Patent Application No. 2008801296087, issued Jan. 7, 2013, with English translation.
Non-Final Office Action issued by the United States Patent and Trademark Office for corresponding U.S. Appl. No. 13/079,265, dated Jan. 31, 2013.
Final Office Action issued by the United States Patent and Trademark Office corresponding to U.S. Appl. No. 131079,265 electronically delivered on Sep. 3, 2013.
Final Office Action issued by the United States Patent and Trademark Office for corresponding U.S. Appl. No. 12/957,478, electronically delivered Jan. 31, 2013.
Non-Final Office Action issued by the United States Patent and Trademark Office for corresponding U.S. Appl. No. 13/736,712 electronically delivered on May 7, 2014.
Non-Final Office Action issued by the United States Patent and Trademark Office for corresponding U.S. Appl. No. 13/862,092 electronically delivered on Jun. 30, 2014.
Final Office Action issued by the United States Patent and Trademark Office for corresponding U.S. Appl. No. 13/736,712 electronically delivered on Aug. 22, 2014.
Third Notification of Office Action issued for corresponding Chinese Patent Application No. 201110069540.1 dated Aug. 28, 2014 with an English translation.
Final Office Action issued by the United States Patent and Trademark Office for corresponding U.S. Appl. No. 13/862,092 electronically delivered on Nov. 18, 2014.
First Office Action issued for corresponding Chinese Patent Application No. 201310163844.3 dated Mar. 26, 2015 with an English translation.
First Office Action issued for corresponding Chinese Patent Application No. 201310163756.3 dated Mar. 26, 2015 with an English translation.

* cited by examiner

*Primary Examiner* — Golam Sorowar
(74) *Attorney, Agent, or Firm* — Myers Wolin, LLC

(57) ABSTRACT

A mobile communication system having a user equipment that performs transmission process having transmission timing adjustment information and a base station that receives a signal sent from the user equipment, the mobile communication system includes, if a timer controlling a term of application of first transmission timing adjustment information expires before transmission of a signal including identification information of the user equipment is performed during a connection process including reception of second transmission timing adjustment information while the user equipment has the first transmission timing adjustment information and performing the connection process to the base station, the user equipment does not transmit the signal.

5 Claims, 37 Drawing Sheets

TIMING ADJUSTMENT METHOD IN A MOBILE COMMUNICATION SYSTEM THAT PERFORMS AN ADJUSTMENT OF UPLINK TRANSMISSION TIMING BY RANDOM ACCESS BETWEEN A USER EQUIPMENT AND A BASE STATION

CROSS-REFERENCE TO RELATED APPLICATION

This present Application is a Divisional Application of U.S. application Ser. No. 12/957,478, filed on Dec. 1, 2010, now pending, which is a Continuation of International Application No. PCT/JP2008/060151 filed on Jun. 2, 2008 in Japan, the contents of each are herein wholly incorporated by reference. The present Application also relates to U.S. application Ser. No. 13/079,265, filed Apr. 4, 2011, now pending.

FIELD

The present disclosure related to a timing adjustment method, a user equipment, a base station, and a mobile communication system. The present disclosure may be used for control uplink (UL) communications in a wireless (mobile) communication system.

BACKGROUND

Currently, third-generation mobile communication services by means of the code division multiple access (CDMA) scheme have just introduced in wireless (mobile) communication systems, including wireless terminals (user terminals), such as cellular phones. At the same time, next-generation mobile communication technologies capable of providing even faster communications have been under development. The 3rd Generation Partnership Project (3GPP) is studying the Long Term Evolution (LTE), as one of such next-generation mobile communication technologies.

In a mobile communication system, as a preparation to a wireless base station (evolved Node B: eNB) and a user terminal (user equipment: UE) for initiating a communication with each other, a channel is provided for the UE to initiate a transmission to the eNB. The 3GPP refers this channel as a "random access channel (RACH)", and refers the procedure for initiating a communication through an RACH as a "random access (RA)".

Random accesses in the LTE are designed in a Slotted Aloha model, wherein a time and frequency resources for sending an RACH are reserved. An RACH contains information, using which the eNB distinguishes UEs from each other which make transmissions. In other words, in order to share an RACH among a plurality of UEs, an identifier called a signature (or preamble) is included.

The respective UEs perform transmission using one signature of a plurality of candidate signatures. Thus, even if the different UEs send signatures via the RACH using the same time and frequency resource, the eNB can distinguish between the UEs based on the received signatures as long as the respective UE employ different signatures.

The RACH is used when initiating a communication, and individual channels (or shared channels) are used afterwards.

A UE make an RA, for example, upon an initial transmission (origination), in response to an incoming transmission from the eNB (generation of downlink (DL) data), upon handover, upon recovery from disconnection (resuming a disconnected communication). As used herein, a wireless link in the direction from the eNB to a UE is referred to as "downlink (DL)", and a wireless link in the opposite direction as "uplink (UL)".

There may be some cases wherein an eNB does not recognize some UEs upon an initial transmission or recovery from disconnection, for example, and no individual signatures that can be exclusively used are allocated to the UEs. Such UEs select one of a plurality of (for example, 64) preset signatures for making an RA. Accordingly, a plurality of UEs may simultaneously make RAs using the same signature, although the possibility of such an event is low. Such an RA procedure is referred to as a "contention based random access procedure (contention based RA procedure).

In such a case, the eNB resolves the conflicted signature (select one of the competing UEs), and sends a response to the selected UE. Each UE determines that UE is selected by the eNB whether a response is received from the eNB. The UE selected by the eNB continues the communication (RA procedure) with the eNB, makes settings for the wireless channel with the eNB, and so on. The UE that was not selected by the eNB tries to retry an RA after a predetermined time interval or otherwise.

Note that such a contention of a signature occurs while a UE makes a handover to switch between eNBs for connecting, the connection might be temporarily disconnected or sometimes a communication might be disconnected. For this purpose, the LTE proposes to allocate individual signatures in advance to each of UEs for making a handover. Such an RA procedure is referred to as "non-contention based random access procedure (non-contention based RA procedure)".

Non-Patent Document 1: 3GPP TS 36.321 V8.1.0; "Evolved Universal Terrestrial Radio Access (E-UTRA); Medium Access Control (MAC) protocol specification", searched online on May 22, 2008, on the Internet; URL: http://www.3gpp.org/ftp/Specs/html-info/36321.htm

SUMMARY

Problems to be Solved by the Invention

Conventionally, inconvenience of adjustment of transmission timing may be experienced during a RA (during execution thereof), due to expiration of information for adjusting the transmission timing.

SUMMARY

For example, the following aspects are used:

(1) A timing adjustment method in a mobile communication system having a user equipment that performs transmission processing based on transmission timing adjustment information and a base station that receives a signal sent from the user equipment, including: in response to receiving second transmission timing adjustment information during connection processing while the user equipment is performing the connection processing to the base station based on first transmission timing adjustment information, applying the first transmission timing adjustment information to transmission timing adjustment for transmission processing until a valid term of the first transmission timing adjustment information; and applying the second transmission timing adjustment information to transmission timing adjustment for transmission processing after the valid term of the first transmission timing adjustment information, may be used.

(2) A timing adjustment method in a mobile communication system having a user equipment that performs transmission processing based on transmission timing adjustment information and a base station that receives a signal sent from the user equipment, including: including second transmission timing adjustment information in a signal including identification information of the user equipment that is sent from the base station to the user equipment during connection processing while the user equipment is performing the connection processing to the base station based on first transmission timing adjustment information, may be used.

(3) A timing adjustment method in a mobile communication system having a user equipment that performs transmission processing based on transmission timing adjustment information and a base station that receives a signal sent from the user equipment, including: in response to receiving second transmission timing adjustment information during connection processing while the user equipment is performing the connection processing to the base station based on first transmission timing adjustment information, continuing to apply the first transmission timing adjustment information without applying the second transmission timing adjustment information and extending a valid term of the first transmission timing adjustment information, may be used.

(4) A timing adjustment method in a mobile communication system having a user equipment that performs transmission processing based on transmission timing adjustment information and a base station that receives a signal sent from the user equipment, including: if a valid term of first transmission timing adjustment information expires before transmission processing of a signal including identification information of the user equipment is performed during connection processing while the user equipment is performing the connection processing to the base station based on the first transmission timing adjustment information, performing the transmission processing of the signal based on the first transmission timing adjustment information, may be used.

(5) A timing adjustment method in a mobile communication system having a user equipment that performs transmission processing based on transmission timing adjustment information and a base station that receives a signal sent from the user equipment, including: if a valid term of first transmission timing adjustment information expires before transmission processing of a signal including identification information of the user equipment is performed during connection processing while the user equipment is performing the connection processing to the base station based on the first transmission timing adjustment information, aborts the connection processing, may be used.

(6) A timing adjustment method in a mobile communication system having a user equipment that performs transmission processing based on transmission timing adjustment information and a base station that receives a signal sent from the user equipment, including: if the user equipment sends a signal including identification information of the user equipment during connection processing while the user equipment is performing the connection processing to the base station based on first transmission timing adjustment information and the base station receives the signal, sending, by the base station, second transmission timing adjustment information to the user equipment, in response to the receiving the signal, may be used.

(7) A user equipment in a mobile communication system having the user equipment and a base station that receives a signal sent from the user equipment, including: a transmission processing unit that performs transmission processing on the base station based on transmission timing adjustment information; and a control unit that, in response to receiving second transmission timing adjustment information during connection processing by the transmission processing unit while the user equipment is performing the connection processing to the base station based on first transmission timing adjustment information, applies the first transmission timing adjustment information to transmission timing adjustment for transmission processing until a valid term of the first transmission timing adjustment information, and applies the second transmission timing adjustment information to transmission timing adjustment for transmission processing by the transmission processing unit after the valid term of the first transmission timing adjustment information, may be used.

(8) A base station in a mobile communication system having a user equipment that performs transmission processing based on transmission timing adjustment information and the base station that receives a signal sent from the user equipment, including: a control unit that includes second transmission timing adjustment information in a signal including identification information of the user equipment that is sent to the user equipment during connection processing while the user equipment is performing the connection processing to the base station based on first transmission timing adjustment information, may be used.

(9) A user equipment in a mobile communication system having the user equipment and a base station that receives a signal sent from the user equipment, including: a transmission processing unit that performs transmission processing on the base station based on transmission timing adjustment information; and a control unit that, in response to receiving second transmission timing adjustment information during connection processing while performing the connection processing to the base station based on first transmission timing adjustment information, continues to apply the first transmission timing adjustment information without applying the second transmission timing adjustment information and extends a valid term of the first transmission timing adjustment information, may be used.

(10) A user equipment in a mobile communication system having the user equipment and a base station that receives a signal sent from the user equipment, including: a transmission processing unit that performs transmission processing on the base station based on transmission timing adjustment information; and a control unit that, if a valid term of first transmission timing adjustment information expires before transmission processing of a signal including identification information of the user equipment is performed during connection processing while performing the connection processing to the base station based on the first transmission timing adjustment information, performs the transmission processing of the signal based on the first transmission timing adjustment information, may be used.

(11) A user equipment in a mobile communication system having the user equipment and a base station that receives a signal sent from the user equipment, including: a transmission processing unit that performs transmission processing on the base station based on transmission timing adjustment information; and a control unit that, if a valid term of first transmission timing adjustment information expires before transmission processing of a signal including identification information of the user equipment is performed during connection processing while performing the connection processing to the base station based on the first transmission timing adjustment information, aborts the connection processing, may be used.

(12) A base station in a mobile communication system having a user equipment that performs transmission processing based on transmission timing adjustment information and the base station that receives a signal sent from the user equipment, including: a reception processing unit that receives a signal sent from the user equipment; and a control unit that, if the reception processing unit receives a signal including identification information of the user equipment during connection processing while the user equipment is performing the connection processing to the base station based on first transmission timing adjustment information and the base station receives the signal, sends second transmission timing adjustment information to the user equipment, in response to the receiving the signal, may be used.

(13) A mobile communication system having a user equipment that performs transmission processing based on transmission timing adjustment information and a base station that receives a signal sent from the user equipment, wherein the system in response to receiving second transmission timing adjustment information during connection processing while the user equipment is performing the connection processing to the base station based on first transmission timing adjustment information, applies the first transmission timing adjustment information to transmission timing adjustment for transmission processing until a valid term of the first transmission timing adjustment information; and applies the second transmission timing adjustment information to transmission timing adjustment for transmission processing after the valid term of the first transmission timing adjustment information, may be used.

(14) A mobile communication system having a user equipment that performs transmission processing based on transmission timing adjustment information and a base station that receives a signal sent from the user equipment, wherein the user equipment includes second transmission timing adjustment information in a signal including identification information of the user equipment that is sent from the base station to the user equipment during connection processing while the user equipment is performing the connection processing to the base station based on first transmission timing adjustment information, may be used.

(15) A mobile communication system having a user equipment that performs transmission processing based on transmission timing adjustment information and a base station that receives a signal sent from the user equipment, wherein in response to receiving second transmission timing adjustment information during connection processing while the user equipment is performing the connection processing to the base station based on first transmission timing adjustment information, the user equipment continues to apply the first transmission timing adjustment information without applying the second transmission timing adjustment information and extends a valid term of the first transmission timing adjustment information, may be used.

(16) A mobile communication system having a user equipment that performs transmission processing based on transmission timing adjustment information and a base station that receives a signal sent from the user equipment, wherein if a valid term of first transmission timing adjustment information expires before transmission processing of a signal including identification information of the user equipment is performed during connection processing while the user equipment is performing the connection processing to the base station based on the first transmission timing adjustment information, the user equipment performs the transmission processing of the signal including the identification information of the user equipment based on the first transmission timing adjustment information, may be used.

(17) A mobile communication system having a user equipment that performs transmission processing based on transmission timing adjustment information and a base station that receives a signal sent from the user equipment, wherein if a valid term of first transmission timing adjustment information expires before transmission processing of a signal including identification information of the user equipment is performed during connection processing while the user equipment is performing the connection processing to the base station based on the first transmission timing adjustment information, the user equipment aborts the connection processing, may be used.

(18) A mobile communication system having a user equipment that performs transmission processing based on transmission timing adjustment information and a base station that receives a signal sent from the user equipment, wherein if the user equipment sends a signal including identification information of the user equipment during connection processing while the user equipment is performing the connection processing to the base station based on first transmission timing adjustment information and the base station receives the signal, the base station sends second transmission timing adjustment information to the user equipment, in response to the receiving the signal, may be used.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Hereunder is a description of embodiments with reference to the drawings. Note that the embodiments that will be described are merely exemplary, and it is not intended to exclude various variations and applications of techniques that are not described. In other words, the present embodiments can be practiced in various ways (by combining examples, for example) without departing from the spirit thereof.

(1) First Embodiment

Figure 1:
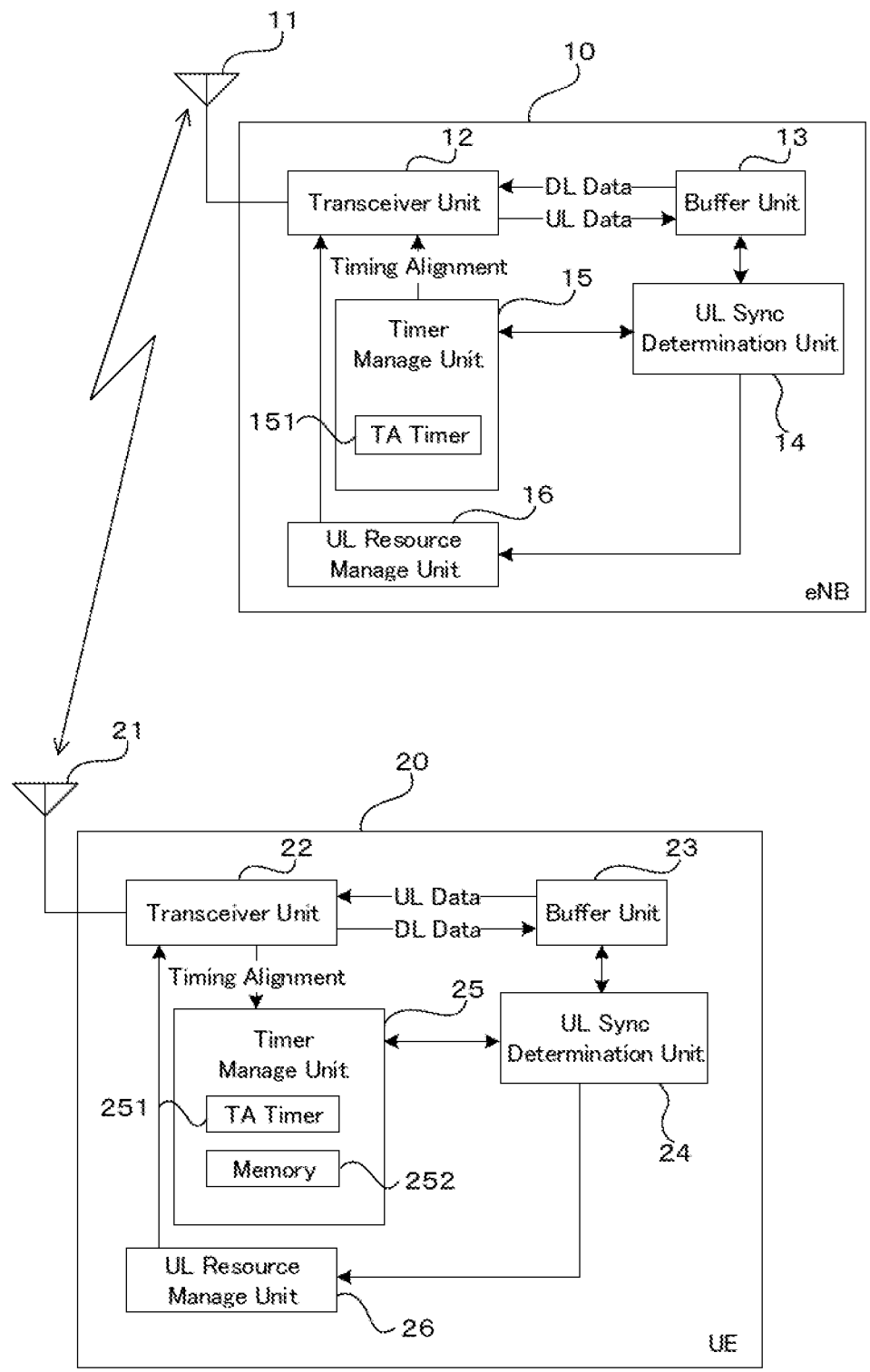
FIG. 1 is a block diagram illustrating one example of a wireless (mobile) communication system in accordance with a first embodiment.

FIG. 1 is a block diagram illustrating one example of a wireless (mobile) communication system in accordance with a first embodiment. The system depicted in FIG. 1 includes an the eNB 10 as one example of a wireless base station, and a UE 20 that may communicate with the eNB 10 via a wireless link in a wireless area of the eNB 10, as one example of a wireless terminal (user equipment).

Although one eNB 10 and one UE 20 are illustrated in FIG. 1, a plurality of eNBs 10 and UEs 20 may be present in this wireless communication system. The wireless link includes DL and UL wireless channels. Each of the DL and UL wireless channels may include a shared channel shared by multiple UEs and individual channels exclusively used by the respective UEs.

In addition, the same configurations of the eNB 10 and the UE 20 depicted in FIG. 1 may be used in second to third embodiments that will be described below. Furthermore, the wireless base station 10 in this embodiment is considered as an eNB of the LTE having a some or all of the functions of a radio network controller (RNC), the wireless base station 10 may be any other base station in older generations than the LTE (without the functions of the RNC). In addition, the wireless base station 10 may be any base station in any other system in which an RA procedure is defined.

(1.1) Description of eNB

The eNB 10 may include a transceiver antenna 11, a transceiver unit 12, a buffer 13, a UL synchronization determination unit 14, a timer management unit 15, and a UL resource management unit 16.

The transceiver antenna 11 (hereinafter, it may be simply referred to as "antenna 11") sends a DL wireless signal which in turn may be received by the UE 20 located within a wireless area (cell or sector) serviced by the eNB 10, as well as receiving a UL wireless signal sent by the UE 20.

The transceiver unit 12 executes predetermined transmission processing on transmission data addressed to the UE 20 (including user data, control data, and the like) to generate a wireless channel signal, and outputs the signal to the transceiver antenna 11. Examples of the transmission processing may include encoding of the DL transmission data, modulation of the encoded data, mapping of the modulated signal to a frame in a predetermined channel, frequency conversion (upconversion) of the frame signal into a wireless frequency, power amplification of the wireless frame. The wireless frame may be a wireless frame based on the Orthogonal Frequency Division Multiplexing (OFDM) or Orthogonal Frequency Division Multiple Access (OFDMA), for example.

The transceiver unit 12 executes predetermined reception processing on a UL wireless signal (wireless frame) received by the antenna 11 to obtain UL data (including user data, control data, and the like) sent by the UE 20. Examples of the reception processing may include low-noise amplification of the received signal, frequency conversion (downconversion) to the baseband frequency, gain adjustment, demodulation, and decoding. Note that the transceiver unit 12 may be divided into a transmitter unit and receiver unit, based on the functions.

The buffer unit 13 temporarily retains UL reception data and/or DL transmission data.

The timer management unit 15 generates a TA (time alignment) value as one example of transmission timing adjustment information that is periodically sent (notification) to the UE 20 for ensuring (maintaining) UL synchronization. Generation and notification of the TA value is performed for a UE 20 for which a call is set and a wireless resource (UL resource) is allocated which is used by the UE 20 for sending UL data.

TA value is one type of control information used for adjusting (synchronizing) the timing of transmission of UL data by the UE 20 and the timing of the reception timing of the UL data by the eNB 10. In other words, the TA value is used to adjust the UL transmission timing by a UE 20 such that reception processing is performed by the transceiver unit 12 at appropriate timing. Accordingly, the UE 20 can ensure UL synchronization by adjusting UL transmission timing in accordance with the TA value received from the eNB 10.

Since a UE 20 may not remain in the same location, TA values are variable in accordance with the distance between the eNB 10 and the UE 20 (location of the UE 20). Hence, in order for the UE 20 to ensure (maintaining) UL synchronization, it is desirable to periodically update the TA value.

As one example for achieving such updating, the eNB 10 periodically generates a TA value in accordance with the location of a UE 20 and notifies the UE 20 of it. A DL control signal used for such a notification is referred to as a "TA command". The eNB 10 can locate a UE 20 using a UL control signal received from that UE 20. The control signal used for this measurement may be a known signal, such as an SRS (sounding reference signal), for example.

In addition, the timer management unit 15 also includes a UL synchronization timer (TA timer 151). The TA timer 151 is started in response to a TA value being send (notified) to a UE 20. The timer management unit 15 monitors this timer value. Since a UE 20 may moves and thus changes its location, a TA value that has been notified to the UE 20 becomes invalid in some point in time. Accordingly, the valid term of a TA value that was notified to a UE 20 is monitored using the TA timer 151. The TA timer 151 is restarted every time a new TA value is generated and notified.

The UL synchronization determination unit (control unit) 14 monitors the TA timer 151 (timer value), and determines whether or not UL synchronization has been established (maintained) for receiving UL data or for receiving an acknowledgement in the UL after sending DL data. For example, if the TA timer 151 expires (is timed out), it is determined that the UL synchronization has been lost even if UL synchronization is actually (in a lower layer) established (maintained).

The UL resource management unit 16 manages UL resources used for UL communications (including communications during an RA) with UEs 20, such as channel frequencies and time (transmission and reception timings), for example, and also manages allocation and deallocation of such resources. When a format for the OFDMA scheme is adopted for a wireless frame, the management of the wireless resource includes management of placement (mapping) of two-dimensional transmission and reception regions (referred to as "bursts") defined by subchannel frequencies and symbol times.

Such UL resources may include UL control channels (PUCCHs: Physical Uplink Control Channels) that individualized for respective UEs 20, and resources of SRSs used by the eNB 10 for channel estimation and locating UEs 20. In addition, PUCCH resources include resources used by UEs 20 for sending CQI (Channel Quality Information) or SRIs (Scheduling Request Indicators) to the eNB 10.

A CQI resource is used for reporting the reception status (quality) at a UE 20 to the eNB 10. The eNB 10 can adaptively control DL transmission (such as the amount of data to be sent, the modulation scheme, the code rate) based on the CQI received from the UE 20.

An SRI resource is used by a UE 20 for informing the eNB 10 that UL data to be sent has been generated at the UE 20 if UL synchronization is established. A UE 20 which has no SRI resource allocated to that UE 20 can inform generation of UL data to the eNB 10 by performing an RA. A UE 20 that has not established UL synchronization yet can inform the eNB 10 of generation of UL data by performing an RA.

The UL resource management unit 16 is allowed to deallocate a PUCCH resource (CQI resource, SRI resource) and an SRS resource that have been allocated to a UE 20 when the TA timer 151 is timed out.

(1.2) Description of UE

In contrast, a UE 20 depicted in FIG. 1 may include a transceiver antenna 21, a transceiver unit 22, a buffer 23, a UL synchronization determination unit 24, a timer management unit 25, and a UL resource management unit 26.

The transceiver antenna 21 (hereinafter, it may be simply referred to as "antenna 21") sends a UL wireless signal to the eNB 10 in a wireless area (cell or sector) serviced by the eNB 10, as well as receiving a DL wireless signal sent by the eNB 10.

The transceiver unit 22 executes predetermined transmission processing on UL transmission data addressed to the eNB 10 (including user data, control data, and the like) to generate a wireless channel signal, and outputs the signal to the transceiver antenna 21. Examples of the transmission processing may include encoding of the UL transmission data, modulation of the encoded data, mapping of the modulated signal to a frame in a predetermined channel, frequency conversion (upconversion) of the frame signal into a wireless frequency, power amplification of the wireless frame.

The transceiver unit 22 executes predetermined reception processing on a DL wireless signal (wireless frame) received by the antenna 21 to obtain DL data (including user data, control data, and the like) sent by the eNB 10. Examples of the reception processing may include low-noise amplification of the received signal, frequency conversion (downconversion) to the baseband frequency, gain adjustment, demodulation, and decoding. Note that the transceiver unit 22 may be divided into a transmitter unit and receiver unit, based on the functions.

The buffer unit 23 temporarily retains UL transmission data and/or DL reception data.

The timer management unit 25 includes a UL synchronization timer (TA timer) 251 that is similar to the corresponding timer in the eNB 10, and monitors the valid term of the TA value by managing (monitoring) the timer value thereof. The TA timer 251 is started or restarted in response to a TA command being received from the eNB 10. If a new TA value is receive from the eNB 10 during a contention-based RA procedure (connection processing), it is possible to rely on the TA value of a TA command received from the eNB 10 before starting the RA procedure. In this case, ignoring a TA value received during the RA procedure is permitted, and any control wherein the TA timer 251 is not restarted is allowed. In addition, the timer management unit 25 includes a memory 252, and stores a TA value received from the eNB 10 during the RA procedure may be stored in the memory 252 for future use.

The UL synchronization determination unit (control unit) 24 monitors the TA timer 251 (timer value), and determines whether or not UL synchronization has been established (maintained). If the TA timer 251 is timed out, it is determined that the UL synchronization has been lost. Accordingly, if a TA value received from the eNB 10 is ignored during an RA procedure, the TA timer 251 is timed out, which may result in determination that synchronization has been lost during the RA procedure.

The UL resource management unit 26 manages UL resources allocated from the eNB 10, and manages disallocation of such resources. If the TA timer 251 is timed out and thus the UL synchronization determination unit 24 determines that synchronization has been lost, the UL resource management unit 26 is allowed to be deallocated an allocated UL resource.

(1.3) Contention-based RA procedure

Figure 2:
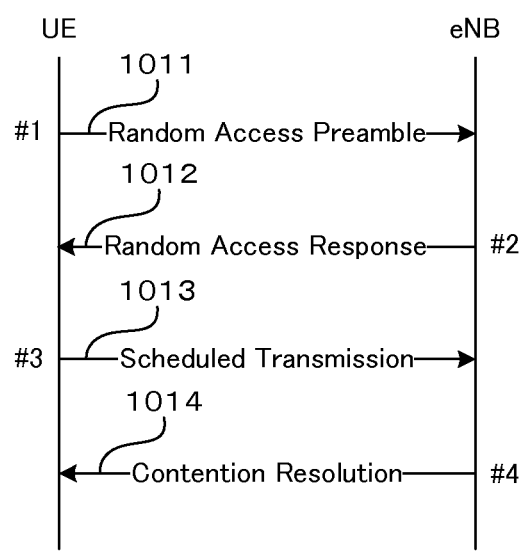
FIG. 2 is a sequence diagram illustrating one example of a contention based RA procedure.
Figure 3:
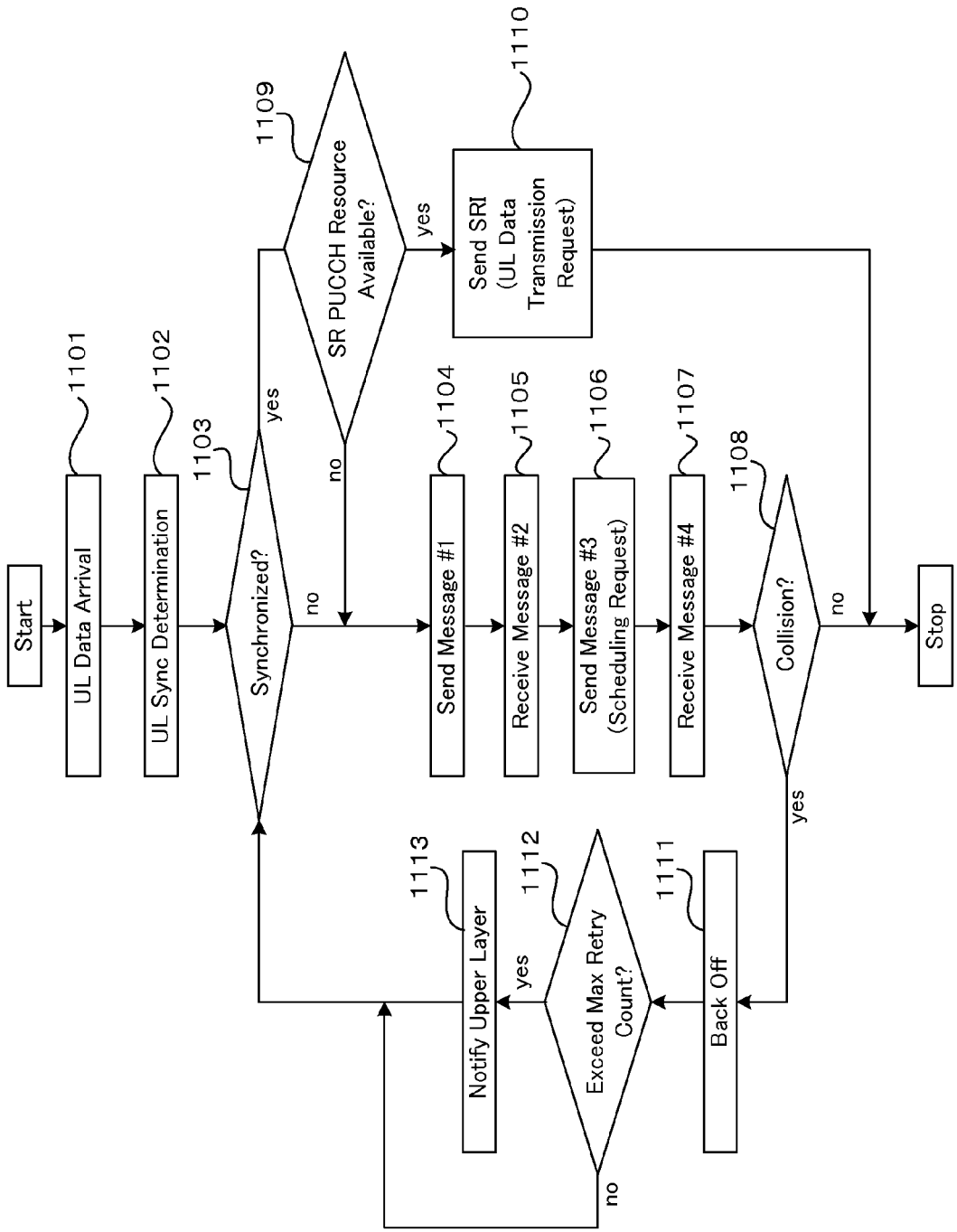
FIG. 3 is a flowchart illustrating an example of the operation of a UE in the contention-based RA procedure.

Hereinafter, a contention-based RA procedure as one example of fundamental connection processing between an eNB 10 and a UE 20 as described above will be described with reference to FIG. 2 to FIG. 4. FIG. 2 is a sequence diagram illustrating one example of a contention based RA procedure. FIG. 3 is a flowchart illustrating one example of a contention-based RA procedure at the UE 20, and FIG. 3 is a flowchart illustrating one example of a contention-based RA procedure at the eNB 10.

A contention-based RA procedure is performed UL data to be sent is generated in the UE 20 (initial transmission by the UE 20), or when DL data directed to the UE 20 arrives at the eNB 10 and an incoming notification of the DL data is received from the eNB 10. The flowchart in FIG. 3 indicates the former scenario while the flowchart in FIG. 4 indicates the latter scenario.

As illustrated in FIG. 3, once UL data is generated in the UE 20, the UE 20 determines, by the UL synchronization determination unit 24, whether or not UL synchronization has been established (Processing 1101 to Processing 1103).

If it is determined that UL synchronization has not been established yet (if "no" in Processing 1103), the UE 20 selects one of a plurality of signatures (preambles) that have been provided by the UL resource management unit 26. This selection is made for the purpose of minimizing the possibility of the same signature being selected by multiple UEs, and a variety of selection schemes may be employed, such as by generating a random number and make a selection based on the random number. The selected signature is included in a message #1 (included in an RA preamble), and is sent from the transceiver unit 22 to the eNB 10 on an RACH (Processing 1011 in FIG. 2 and Processing 1104 in FIG. 3).

In response to receiving the message #1, the eNB 10 sends a response message #2 (RA response) to that message, to the UE 20 (Processing 1012 in FIG. 2). This RA response #2 may include identifier(s) of one or more signatures which have been received (identified) by the eNB 10, transmission grants for the shared UL channel corresponding to the signatures, and an identifier temporarily allocated for identifying a destination (UE 20) in subsequent RA communications. This identifier is referred to as a "temporary-connection radio network temporary identifier (T-CRNTI)".

In response to receiving the RA response #2 from the eNB 10 (Processing 1105 in FIG. 3), the UE 20 checks whether or not the signature that was sent in the message #1 is contained in the received information.

When it is contained, the UE 20 sends (scheduled transmission) a message #3 based on the transmission grant that is contained in the RA response #2 and corresponds to the signature which the UE 20 sent (Processing 1013 in FIG. 2 and Processing 1106 in FIG. 3). The message #3 is a signal containing scheduling request to the eNB 10, and may include a system architecture evolution (SAE)—temporary mobile subscriber identity (S-TMSI) as one example of the identification number of the UE 20.

The UE 20 selects a signature in the message #1, and it is possible that multiple UEs 20 simultaneously send messages #1 to the eNB 10 using the same signature.

In such as case, although the eNB 10 cannot distinguish the UEs 20 from each other, the eNB 10 can identify the UEs 20 causing the contention of the signature by using received identification numbers (S-TMSIs) sent from the UEs 10 in the message 3. Accordingly, the eNB 10 can selects one of the UEs 20, thereby resolving the contention. The selection may be based on the received field intensities of the messages #1. For example, the eNB 10 selects one UE 20 that has the strongest received field intensity of the message #1.

The eNB 10 sends a message #4 (Contention Resolution) to the UE 20 selected in the contention resolution (Processing 1014 in FIG. 2). This message #4 may include information sent in the message #3, such as the S-TMSI.

In response to receiving the message #4 from the eNB 10 (Processing 1107 in FIG. 3), the UE 20 checks whether there is any contention with other UEs 20 (checks whether or not its own identification information is included or not) (Processing 1108 in FIG. 3), and the UL connection processing is completed if there is no contention (the "no" route from Processing 1108 in FIG. 3). After this step, the UE 20 employs the temporary identifier (T-CRNTI) that was temporarily allocated for communications with the eNB 10, as non-temporary identifier (C(cell)-RNTI).

Otherwise, if it is confirmed that there is contention with other UE(s) 20 as a result of receiving the message #4 (if its own identification information is not included) ("yes" in Processing 1108), that UE 20 waits for a time period specified in a backoff (Processing 1111). Here, the "backoff" refers to information specifying the timing for the UE 20 to retry a contention-based RA procedure (waiting time period).

The parameter of the backoff is notified in the message #2, and using different values of the backoff for respective UEs 20 can significantly reduce the possibility of another contention upon retrying. More specifically, the maximum of the backoff time is notified in the message #2, and a UEs 20 calculate backoff time in this range. For calculating the backoff time, various techniques may be employed, such as using a random number.

The UE 20 then checks whether or not a maximum retry count is reached by a retry of a further next RA procedure (Processing 1112). If the maximum retry count is not reached (if "no" in Processing 1112), the UE 20 retries RA procedure by performing Processing 1103 and subsequent steps (sends a message #1). If the maximum retry count is reached (if "yes" in Processing 1112), the UE 20 notifies the upper layer of this fact (Processing 1113). The upper layer is a radio resource control (RRC) layer that belongs to the layer 3, for example.

In response to the notification, the upper layer starts a monitor timer that monitors if RA continues (is retried). If this monitor timer is timed out, the upper layer of the UE 20 performs a control for reselecting an eNB 10 (cell) to which a UL connection request is to be sent (a message #1 is to be sent) (cell selection control or cell reselection control).

Note that if UL synchronization has been established in Processing 1103, (if "yes" in Processing 1103), the UE 20 checks whether or not a PUCCH resource (SRI resource) has been allocated (Processing 1109). If so (if "yes" in Processing 1109), the UE 20 sends an SRI (transmission request for UL data) to the eNB 10 using the SRI resource (Processing 1110).

If no SRI resource has been allocated (if "no" in Processing 1109), the UE 20 sends a message #1 to the eNB 10 to perform an RA procedure. As described above, even when it is determined in Processing 1103 that synchronization has been established, in some cases, a RA procedure is performed if there is no SR PUCCH resource.

Figure 4:
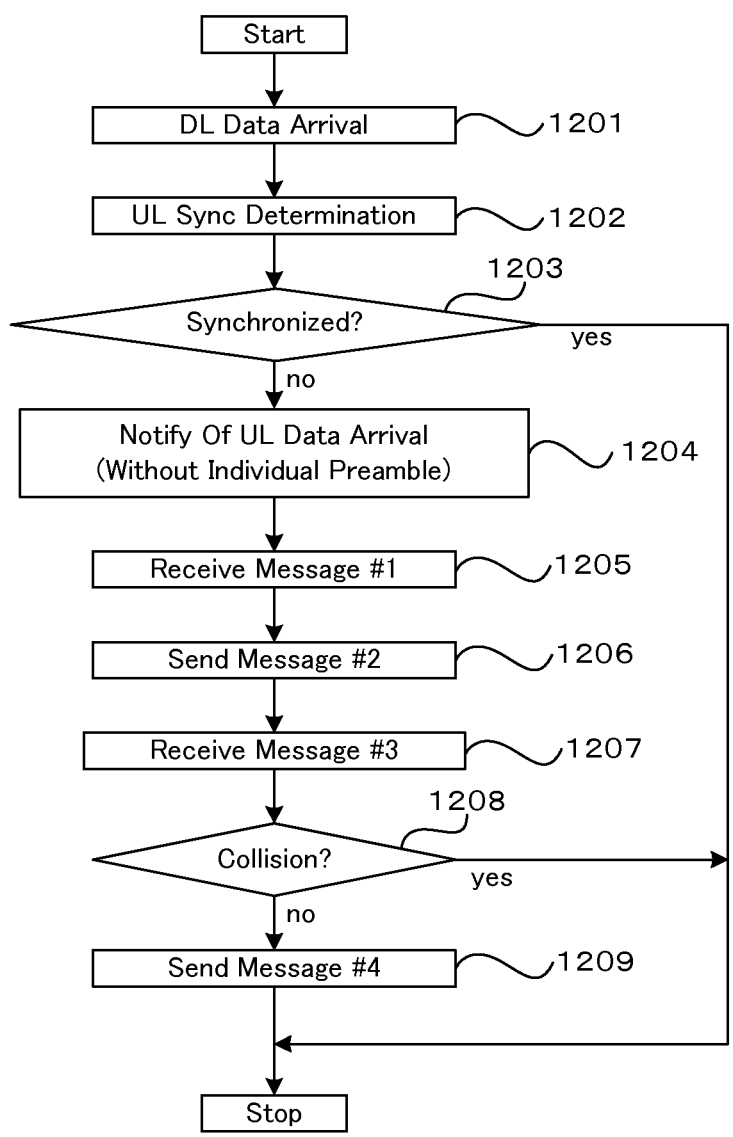
FIG. 4 is a flowchart illustrating an example of the operation of an eNB in the contention-based RA procedure.

In contrast, an RA procedure by the eNB 10 is illustrated in FIG. 4 wherein DL data addressed to a UE 20 is arrived at the eNB 10 and the UE 20 is notified of the arrival of the DL data by the eNB 10.

More specifically, when DL data addressed to a UE 20 is arrived at the eNB 10 (Processing 1201), the eNB 10 determines, by the UL synchronization determination unit 14, whether or not UL synchronization has been established (Processing 1202 and Processing 1203). If UL synchronization has not been established yet (if "no" in Processing 1203), the eNB 10 notifies the UE 20 of the arrival of the DL data (Processing 1204).

Although an individual preamble may be included in this notification (incoming notification), no individual signature for the UE 20 (individual preamble) is not included in this embodiment. Accordingly, the UE 20 that receives the incoming notification will perform a contention-based RA procedure described above. In this case, if a UL resource has been allocated, that UL resource is deallocated and a new UL resource is allocated from the eNB 10 after a successful RA.

In response to receiving the message #1 (RA preamble) from the UE 20 that has started the contention-based RA procedure (Processing 1205), the eNB 10 sends a response thereto (message #2) to the UE 20 (Processing 1206).

In response to receiving a message #3 from the UE 20 (Processing 1207), the eNB 10 checks whether or not there is any collision of messages (Processing 1208). If not, the eNB 10 sends a message #4 to the UE 20 (from the "no" route of Processing 1208 to Processing 1209). If there is a collision of messages (if "yes" in Processing 1208), the eNB 10 terminates the RA procedure without sending a message #4.

One fundamental procedure of a contention-based RA is as described above. Here, it is assumed that the eNB 10 does not correctly know the value of a TA timer 251 in a UE 20 (timer values of the TA timer 151 in the eNB 10 and the TA timer 251 in the UE 20 are not synchronized).

As an example, let's assume a case in which the TA timer 251 in the UE 20 continue to count time, but the eNB 10 misunderstands that the TA timer 251 in the UE 20 is timed out because the eNB 10 cannot know that the TA timer 251 still works.

Figure 5:
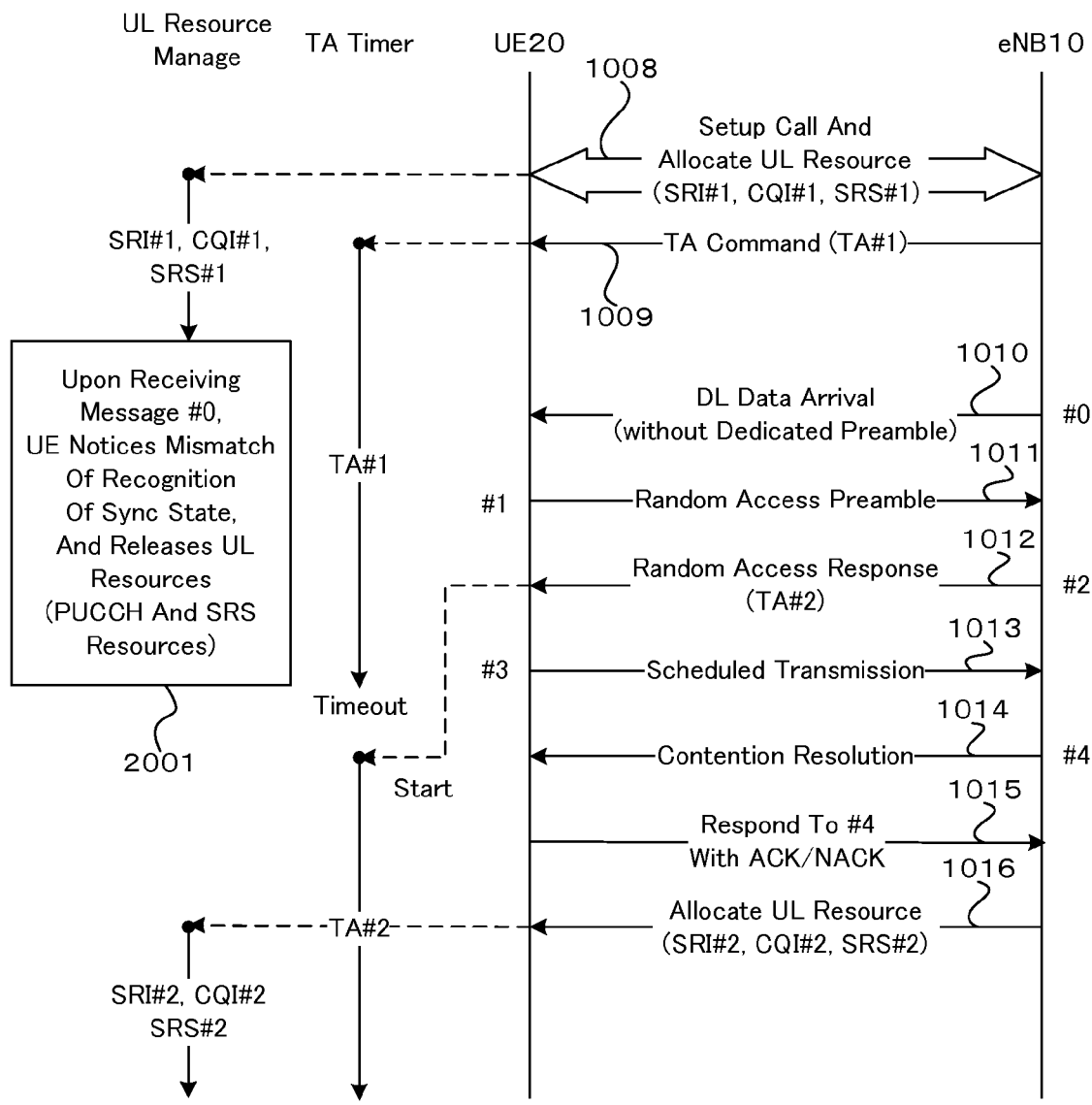
FIG. 5 is a sequence diagram illustrating one example of a UL communication control (technique 1-1) according to a first embodiment.
Figure 6:
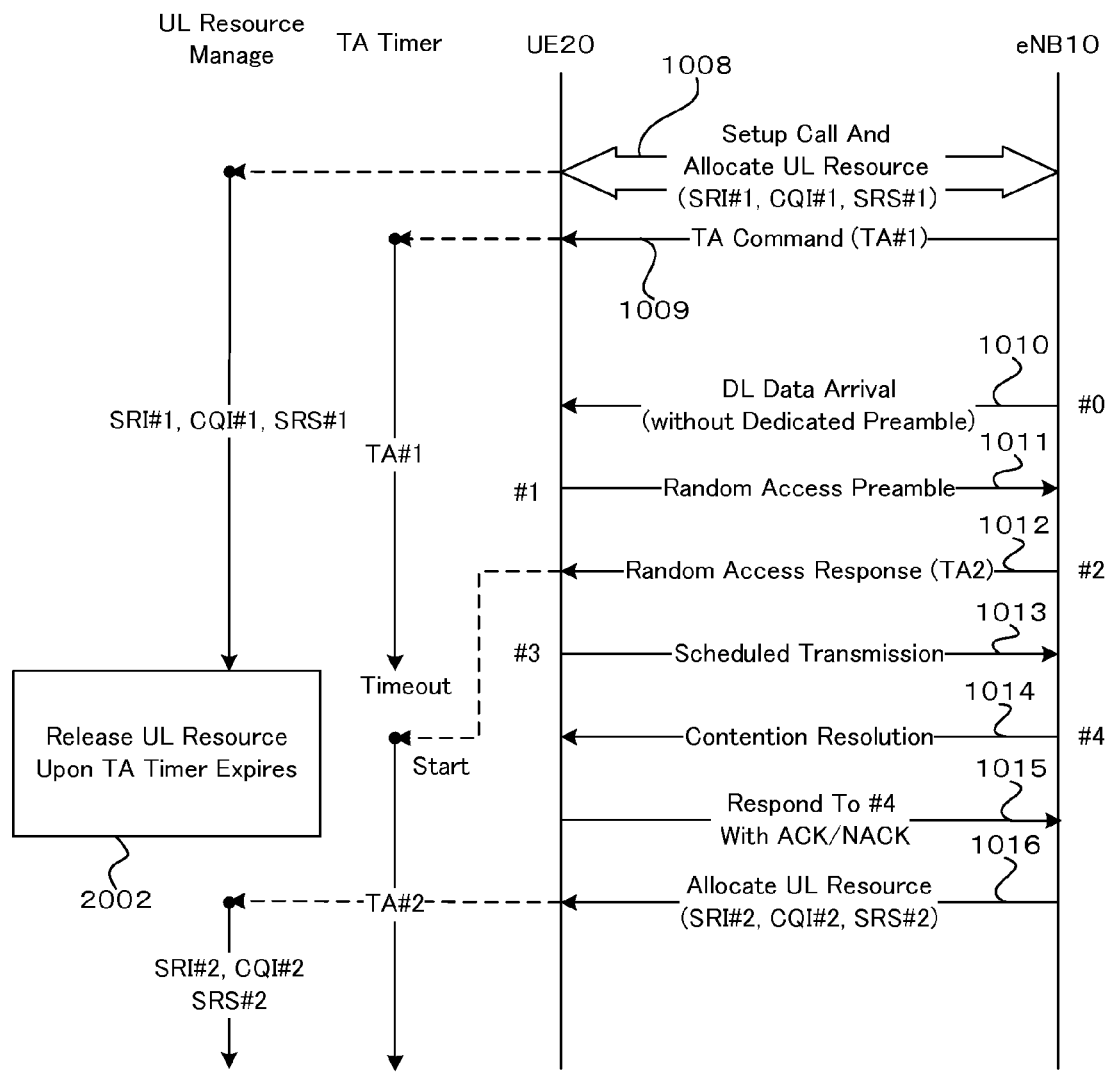
FIG. 6 is a sequence diagram illustrating another example of a UL communication control (technique 1-1) according to the first embodiment.
Figure 7:
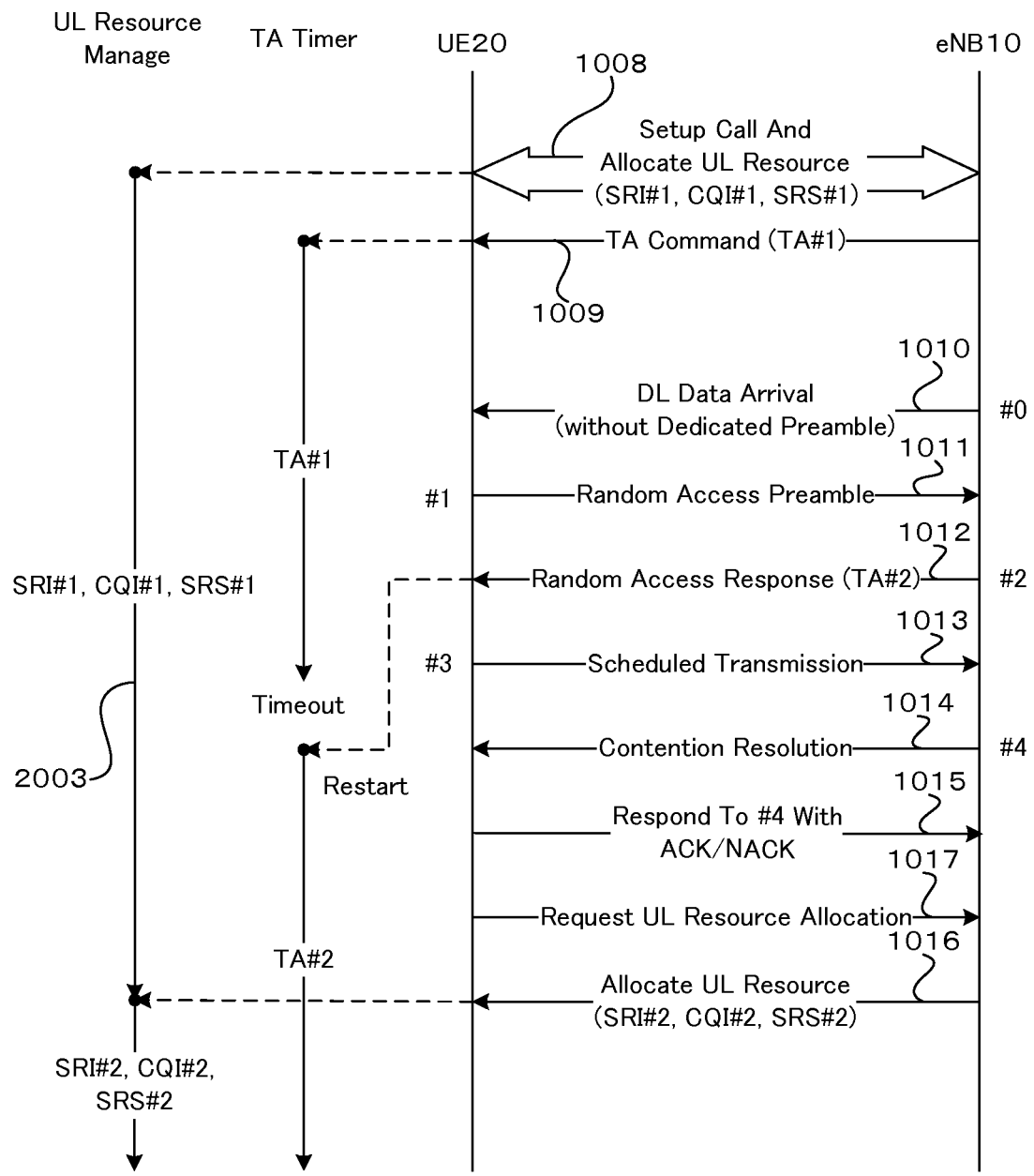
FIG. 7 is a sequence diagram illustrating another example of a UL communication control (technique 1-1) according to the first embodiment.

One example is illustrated in FIG. 5 to FIG. 7 (FIG. 9 to FIG. 11, FIG. 13 to FIG. 15, and FIG. 17 to FIG. 19). After performing call setting and UL resource allocation (SRI resource #1, CQI resource #1, SRS resource #1, for example) for the UE 20 (Processing 1008), the eNB 10 periodically sends a TA command to the UE 20 (Processing 1009). In response to receiving the TA command (TA value=TA #1; first timing adjustment information), the UE 20 start the TA timer 251.

After the UE 20 performs UL transmission based on TA #1 notified in the TA command and the transmission ends, DL data addressed to the UE 20 arrives at the eNB 10. The eNB 10 sends an incoming notification to the UE 20 (sends a message #0) (Processing 1010). In response to the incoming notification #0, the UE 20 starts a contention-based RA procedure for establishing UL synchronization and reserving resources.

More specifically, the UE 20 sends a message #1 including a selected signature (random preamble) to the eNB 10 (Processing 1011). In response to receiving this message #1, the eNB 10 responds to the UE 20 with an RA response #2 (Processing 1012). At this time, the eNB 10 includes a new TA value (TA #2; second timing adjustment information) in the RA response #2.

After receiving the RA response #2, the UE 20 may use the new TA #2 to restart the TA timer 251. However, as described previously, the UE 20 may also ignore this TA #2. If the TA #2 is ignored, the TA timer 251 may be timed out in somewhere between when sending a message #3 and when receiving a message #4 (Processing 1014).

In such a case, the UE 20 determines that synchronization has been lost and deallocates all of reserving UL resource, which makes subsequent transmissions other than via the RACH impossible.

In this embodiment, UL synchronization and UL resources are maintained in the following manner if the TA timer 251 is timed out in during a contention-based RA procedure. In the drawings referenced to in the following description (including those for other embodiments described later), processing having an identical processing number refers to the same or similar processing, unless otherwise stated.

(1.4) Case in which no contention with other UE(s) 20 occurs when a message #4 is received If there is no contention with other UE(s) 20 (if an RA is successful), an individual UL resource is reserved for the UE 20 that performed the RA. However, since the TA timer 251 is timed out, it is uncertain that UL synchronization has been established.

Thus, the UE 20 tries to establish UL synchronization using tone of the following four techniques 1-1 to 1-4.

(1.4.1) Technique 1-1 (FIG. 5 to FIG. 8)

Figure 8:
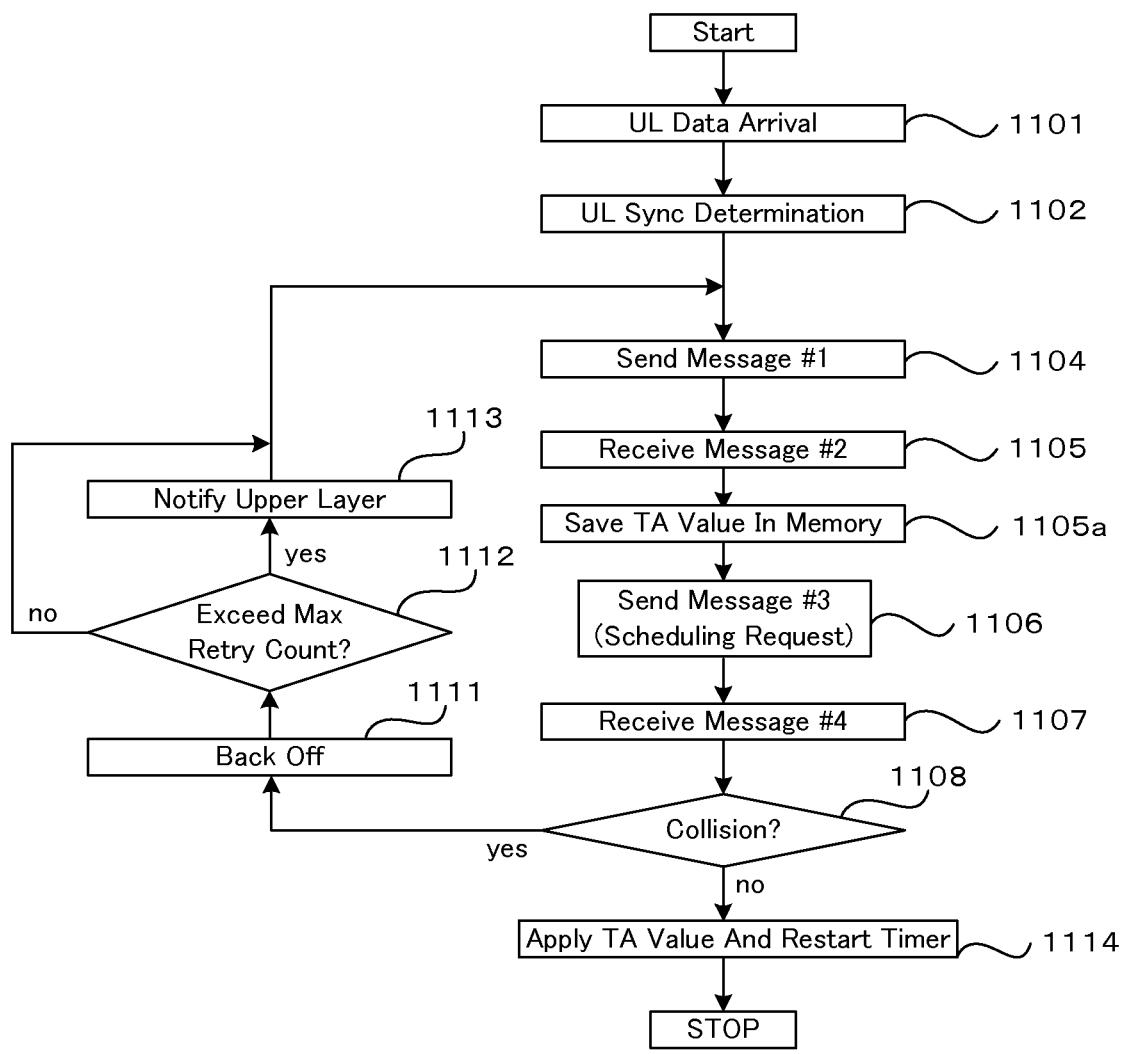
FIG. 8 is a flowchart illustrating one example of a UL communication control (technique 1-1) by a UE according to a first embodiment.
Figure 9:
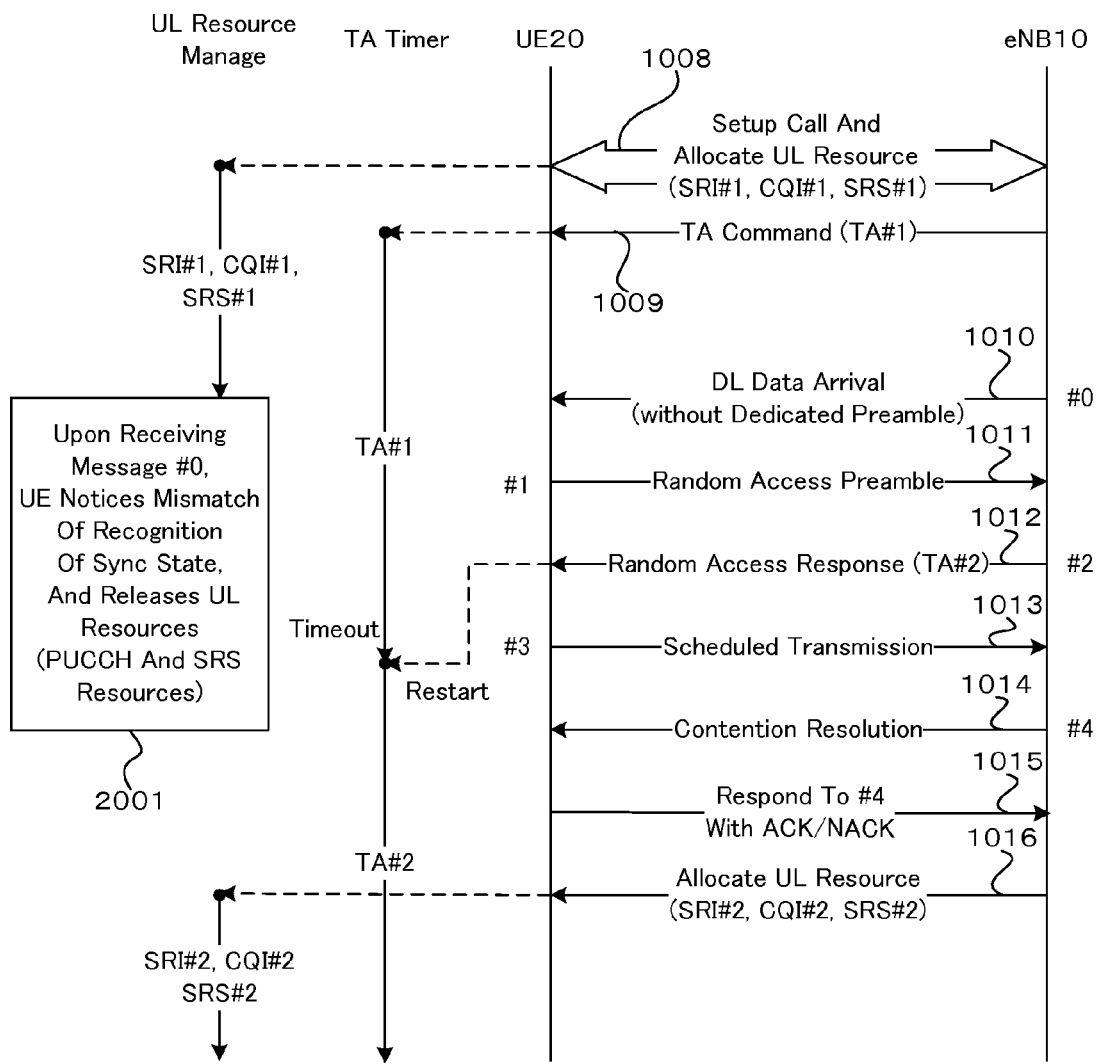
FIG. 9 is a sequence diagram illustrating one example of a UL communication control (technique 1-2) according to a first embodiment.
Figure 10:
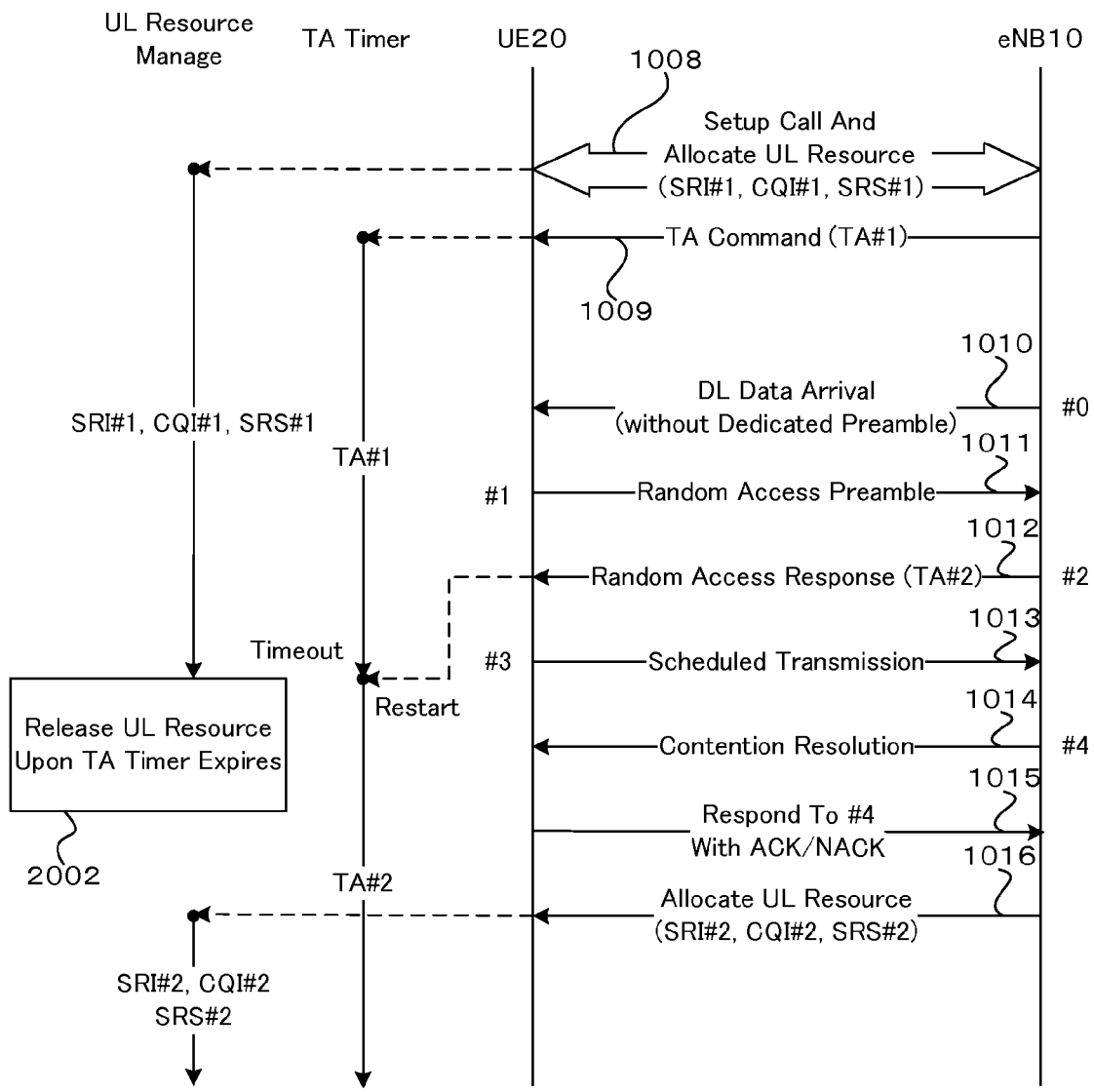
FIG. 10 is a sequence diagram illustrating another example of a UL communication control (technique 1-2) according to the first embodiment.
Figure 11:
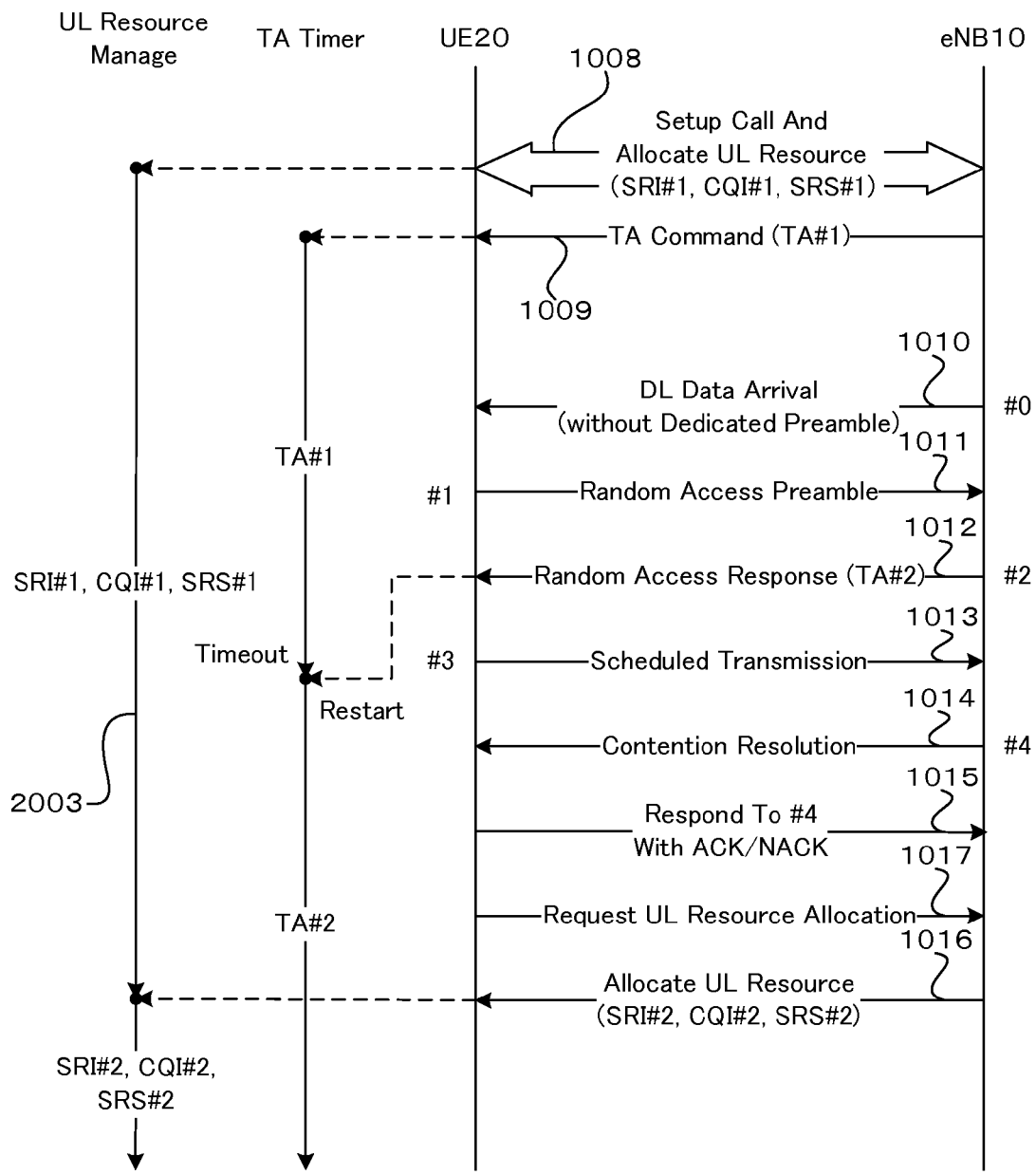
FIG. 11 is a sequence diagram illustrating another example of a UL communication control (technique 1-2) according to the first embodiment.

As illustrated in FIG. 8, the UE 20 stores, in the memory 252 in the timer management unit 25, the TA value (TA #2) received in the message #2 during a contention-based RA procedure (Processing 1105a).

If the UE 20 (the UL resource management unit 26) detects loss of UL synchronization, the UE 20 can deallocate UL resources that was used in transmission processing based on the TA #1 receive before the contention-based RA was started (UL resources allocated from the eNB 10 before the start of the contention-based RA).

The deallocation may be done when an incoming notification message #0 described above is received (when it is recognized that management of UL synchronization is not out of sync with the eNB 10) (Processing 2001), as illustrated in FIG. 5, or when the TA timer 251 is timed out, as depicted in FIG. 6 (Processing 2002), for example. As illustrated in FIG. 7, even if the TA timer 251 is timed out, it is possible to maintain the UL resources (continue to use them), instead of deallocating them (Processing 2003).

Thereafter, if the UE 20 continues the contention-based RA procedure and succeeds in receiving the message #4, the UE 20 applies TA value (TA #2) stored in the memory 252 for the UL transmission and restarts the TA timer 251 (from the "no" route of Processing 1108 to Processing 1114).

In other words, the application of the TA #2 is allowed once the UE 20 receives a message #2 (response signal) containing a T-CRNTI as an example of identification information of the UE 20 during the RA after the TA timer 251 is timed out. Here, the term "application of the TA value" means controlling UL transmission (performance of the RA) based on the transmission timing indicated by TA value. The control may be achieved by one function of the UL synchronization determination unit 24, for example (this applied to the embodiments that will be described).

At this time, the value of the TA timer 251 may be a predetermined value, or may be set based on the timing of receiving the message #2. For example, the value of the TA timer 251 may be set by subtracting the time difference between when the message #2 was received and when the message #4 was received from a predetermined value, assuming that UL synchronization has been successfully established at the time when the message #2 was received. This result in an earlier expiration of timer value (the valid term of timing adjustment information) by the time different between when the TA #2 is notified in the message #2 and when the result of an RA is notified.

As described above, in this embodiment, once receiving the TA #2 during an RA while the UE 20 is performing the RA to the eNB 10 based on the TA #1, the UE 20 applies the TA #1 to transmission timing adjustment, for transmission processing until the TA timer 251 is timed out (the valid term of the TA #1 expires). For transmission processing, the TA #2 is applied to transmission timing adjustment once the TA timer 251 is timed out (the valid term of the TA #1 expires).

Thereby, the TA #2 is applied to perform transmission control after the valid term of the TA #1 expires (after it is timed out), without immediately updating transmission timing by means of the TA #2.

Thereafter, the UE 20 responds to the eNB 10 with an acknowledgement message (ACK or NACK) to the message #4 (Processing 1015). Once receiving an ACK as acknowledgement message to the message #4, the eNB 10 allocates a new UL resource (SRI resource #2, CQI resource #2, SRS resource #2, for example) to the UE 20 (Processing 1016).

As illustrated in FIG. 7, the UE 20 may continue to use a UL resource that has been reserved if not disallocating the UL resource even when the TA timer 251 in the UE 20 is timed out. Instead, the UE 20 may request allocation of an alternative UL resource to the eNB 10 (Processing 1017).

The UE 20 manages the allocated UL resource in the UL resource management unit 26, and performs UL transmissions to the eNB 10 using that UL resource.

(1.4.2) Technique 1-2 (FIG. 9 to FIG. 12)

In a second technique, a UE 20 stores, in a memory 252, a TA value (TA #2) receive in a message #2, as illustrated in FIG. 9 to FIG. 12 (Processing 1105a). Thereafter, it is assumed that the TA timer 251 is timed out between when a message #3 is send (Processing 1013) and when a message #4 is received (Processing 1014).

Figure 12:
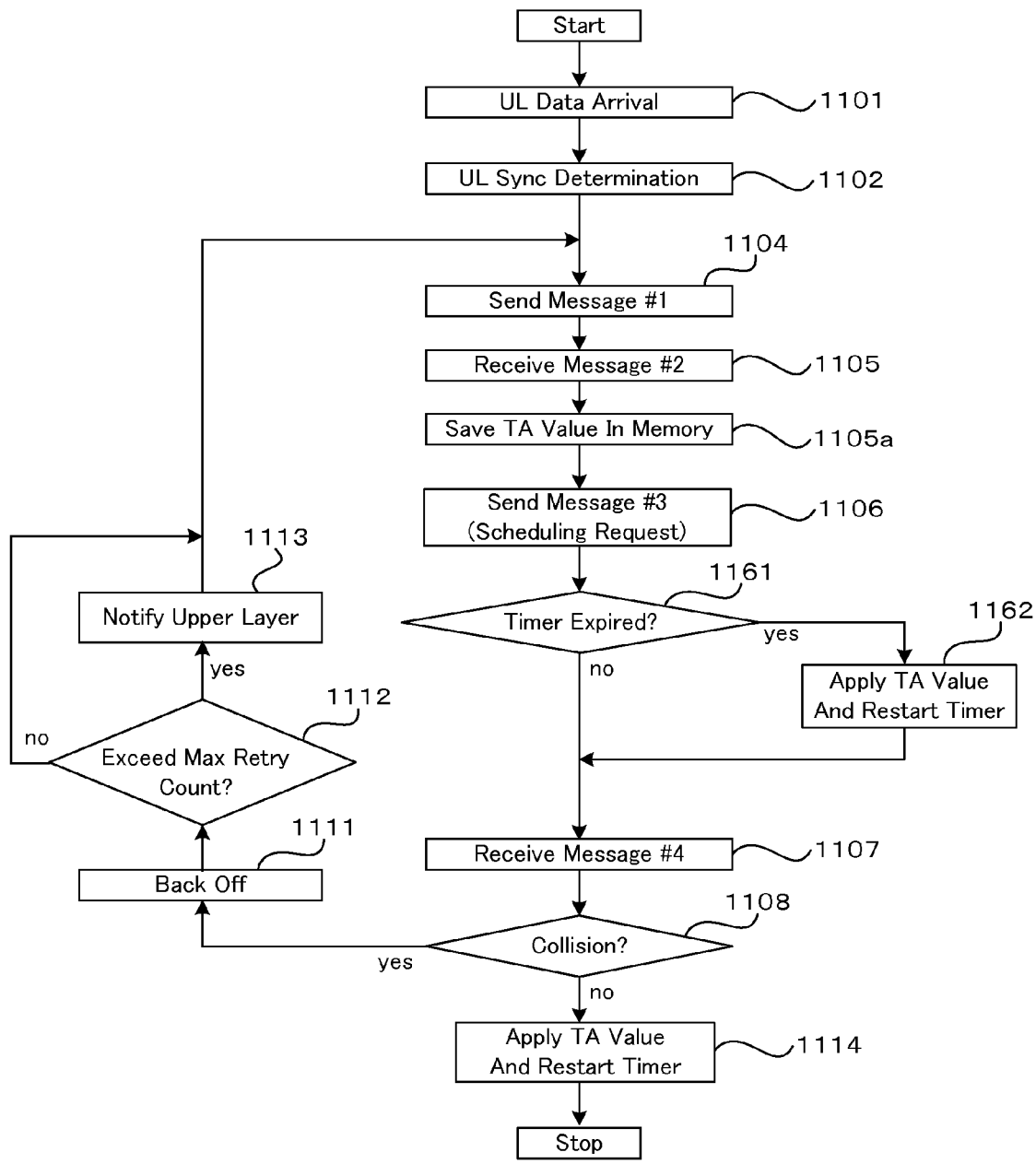
FIG. 12 is a flowchart illustrating one example of a UL communication control (technique 1-2) by a UE according to a first embodiment.

In such a case, the UE 20 applies the TA value (TA #2) stored in the memory 252 to UL transmissions and restarts the TA timer 251, without waiting to receive a message #4 ("yes" route of Processing 1161 to Processing 1162 in FIG. 12). The restart may be performed at the same time when the TA timer 251 is timed out. In other words, application of the TA #2 receive in the message #2 is allowed at the time when the TA timer 251 is timed out (the valid term of the TA #1).

Thereby, the TA #2 is applied to perform transmission control at the time when the valid term of the TA #1 expires (when it is timed out), without immediately updating transmission timing by means of the TA #2.

(1.4.3) Technique 1-3 (FIG. 13 to FIG. 16)

Figure 13:
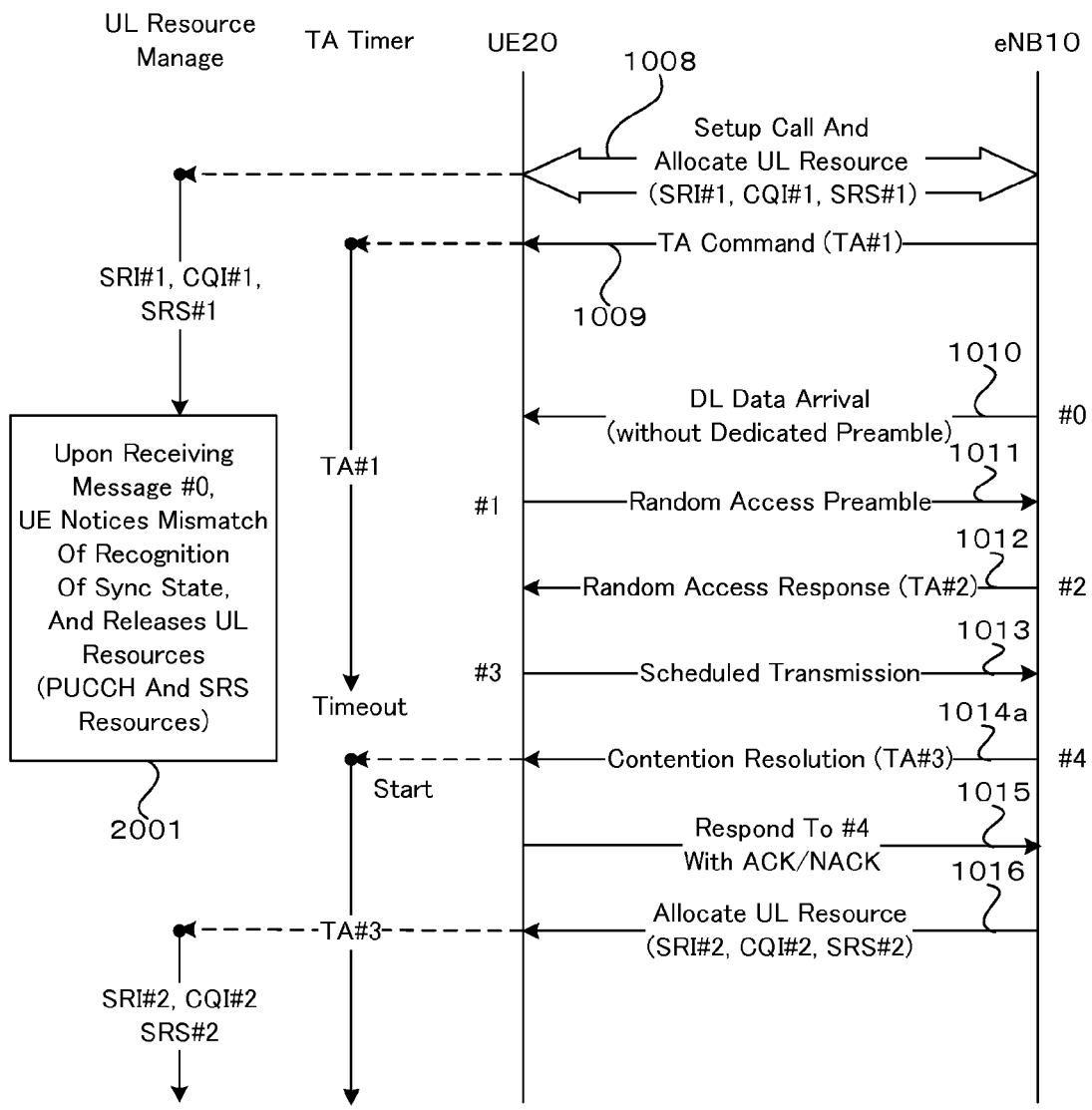
FIG. 13 is a sequence diagram illustrating one example of a UL communication control (technique 1-3) according to a first embodiment.
Figure 14:
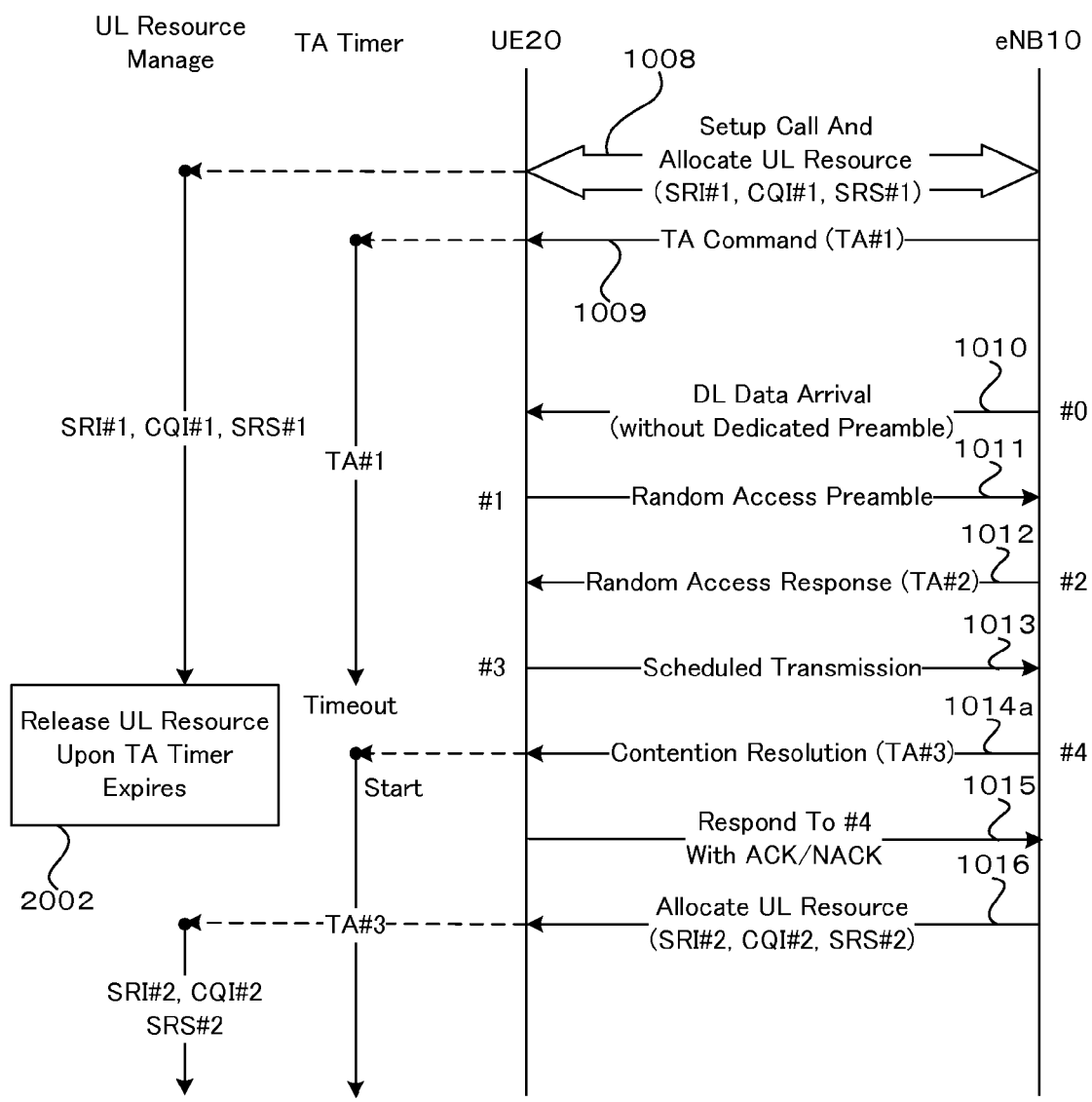
FIG. 14 is a sequence diagram illustrating another example of a UL communication control (technique 1-3) according to the first embodiment.
Figure 15:
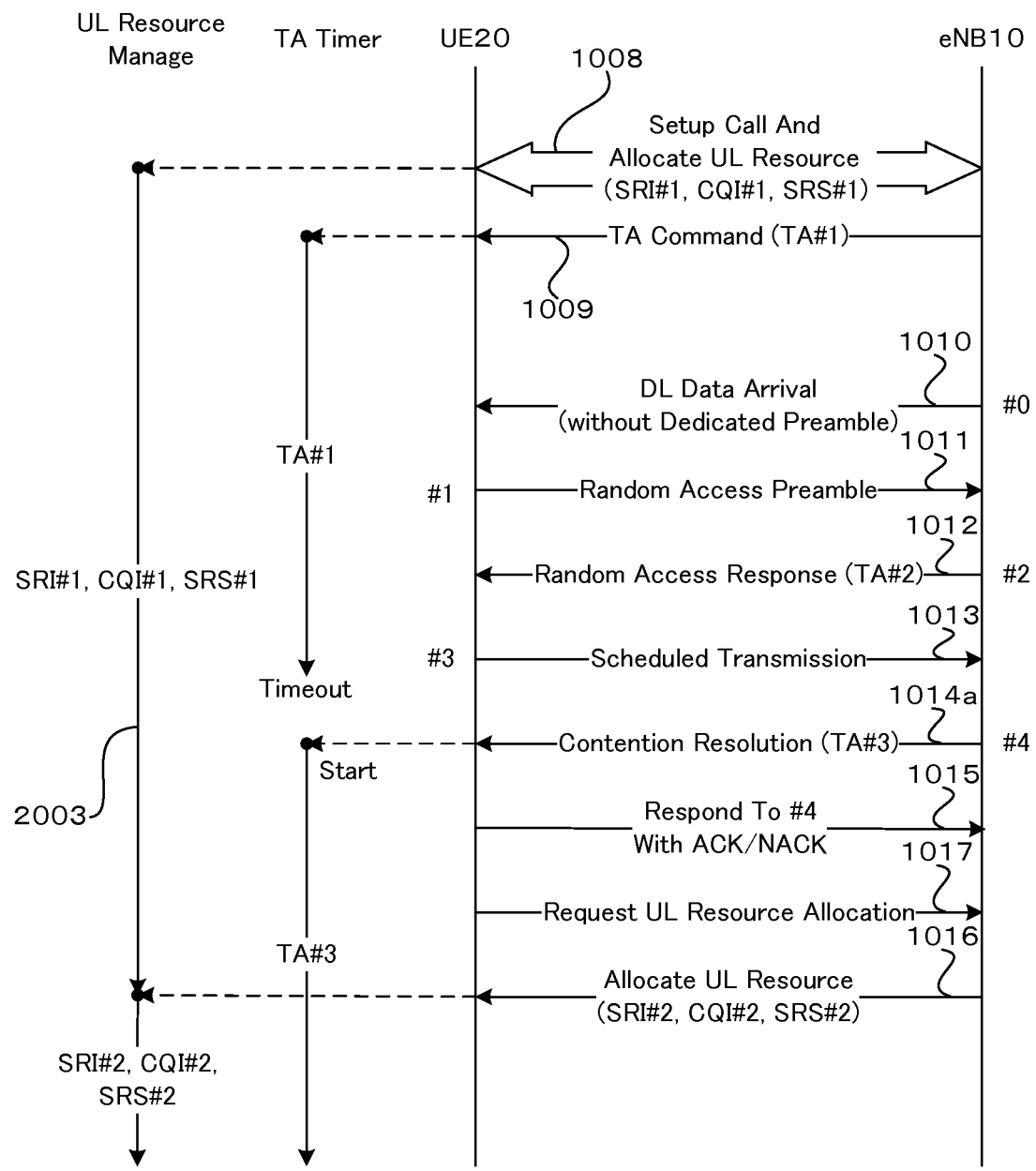
FIG. 15 is a sequence diagram illustrating another example of a UL communication control (technique 1-3) according to the first embodiment.
Figure 16:
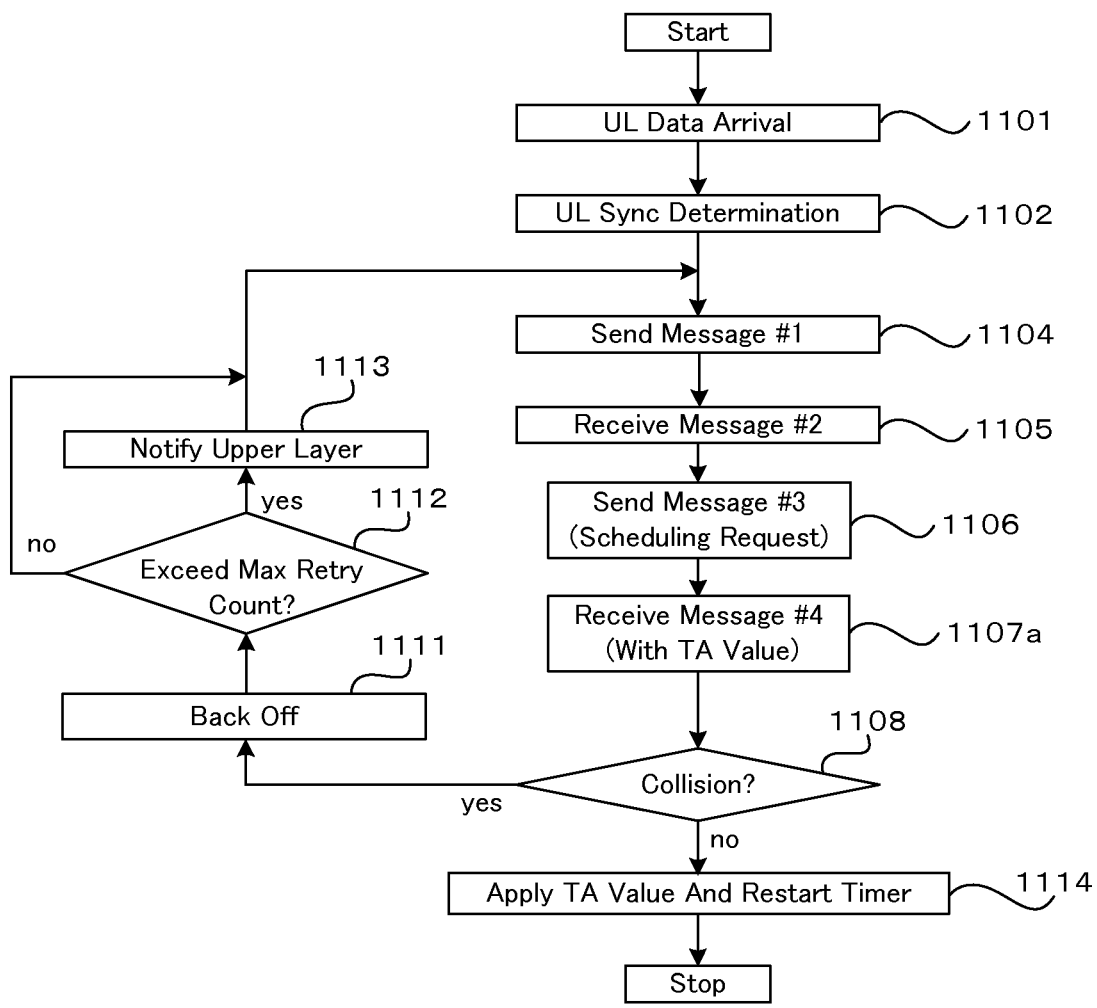
FIG. 16 is a flowchart illustrating one example of a UL communication control (technique 1-3) by a UE according to a first embodiment.
Figure 17:
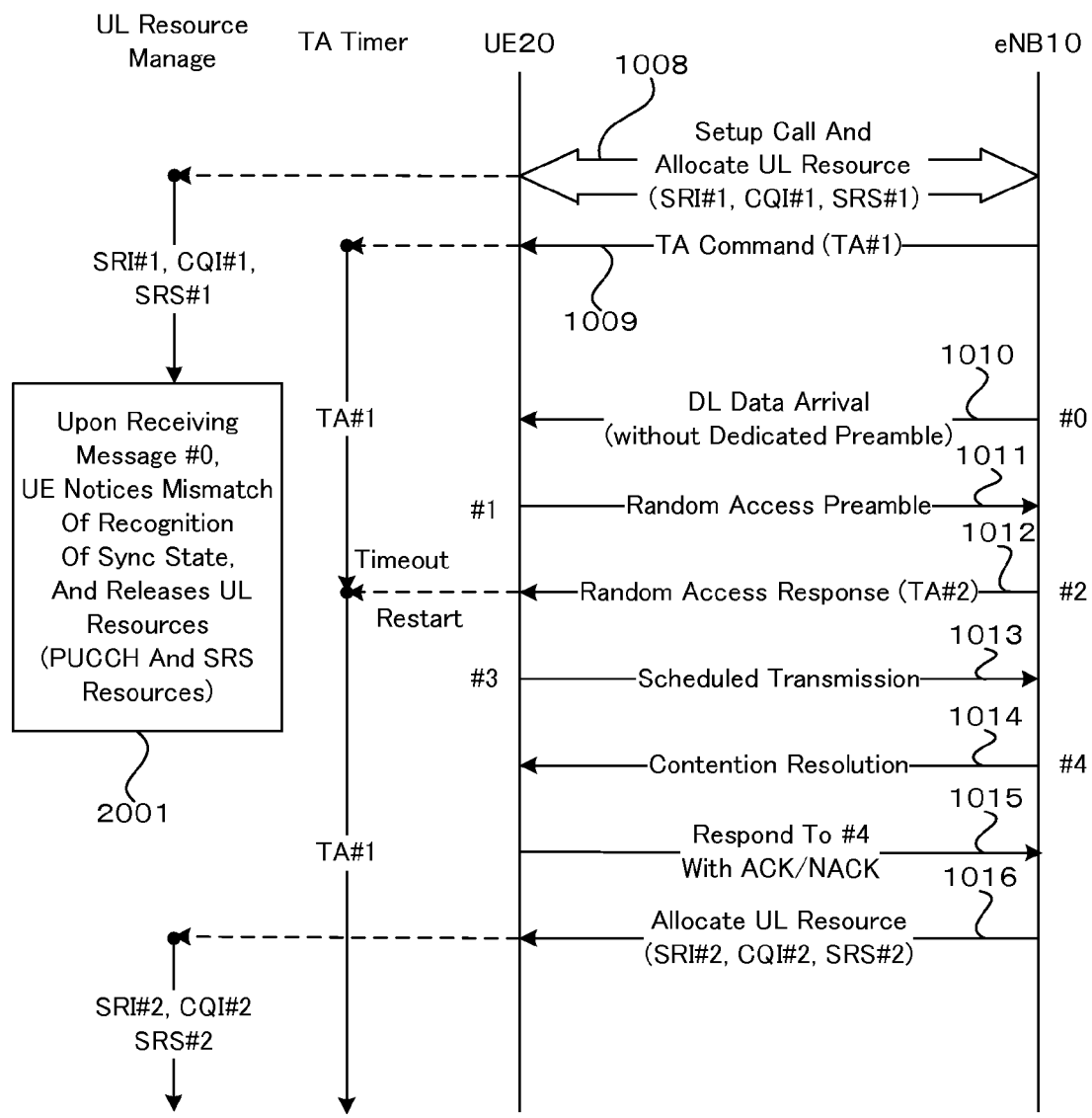
FIG. 17 is a sequence diagram illustrating one example of a UL communication control (technique 1-4) according to a first embodiment.
Figure 18:
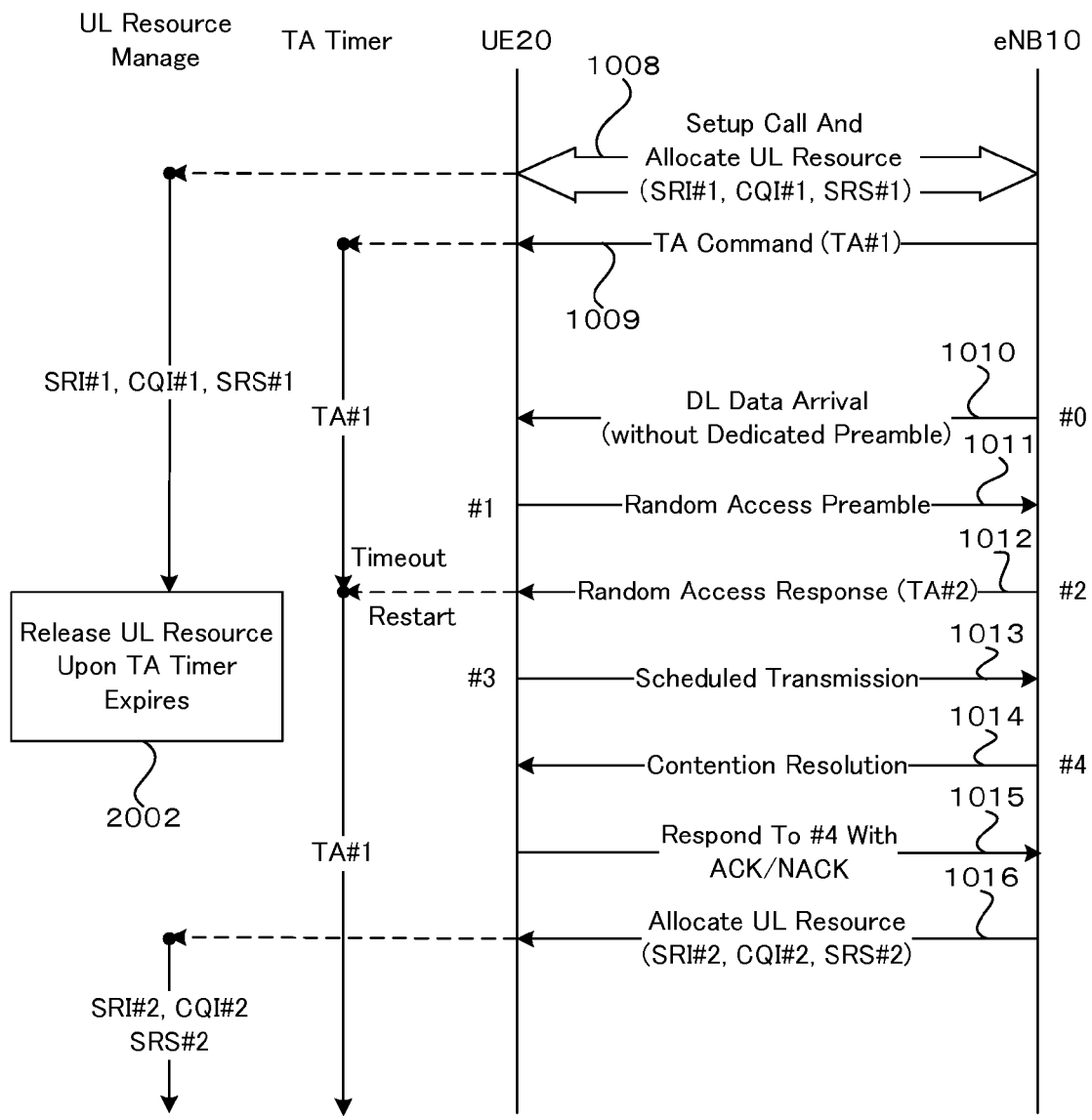
FIG. 18 is a sequence diagram illustrating another example of a UL communication control (technique 1-4) according to the first embodiment.
Figure 19:
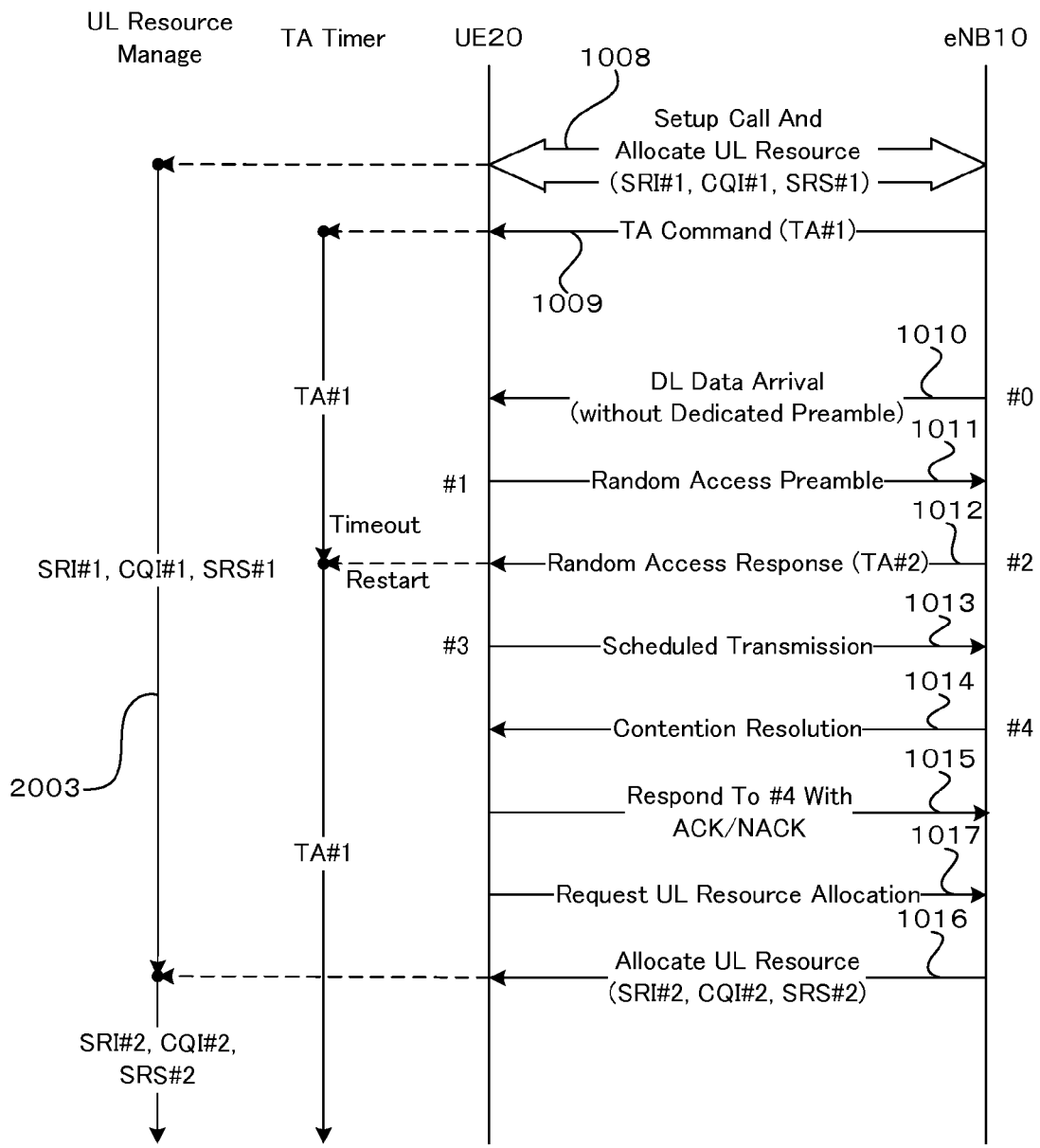
FIG. 19 is a sequence diagram illustrating another example of a UL communication control (technique 1-4) according to the first embodiment.

In a third technique, the eNB 10 includes a new TA value (TA #3) when sending a message #4, as illustrated in FIG. 13 to FIG. 16 (Processing 1014a in FIG. 13 to FIG. 15, and Processing 1107a in FIG. 16).

More specifically, the eNB 10 includes a TA #3 (second transmission timing adjustment information) in a message #4 (signal including an S-TMSI as one example of identification information of the UE 20) to be sent to the UE 20 during an RA while an UE 20 is performing the RA to the eNB 10 based on a TA #1 (first transmission timing adjustment information).

In response to receiving the message #4 from the eNB 10, the UE 20 applies a TA value (TA #3) included in the message #4 to UL transmissions and starts the TA timer 251 (Processing 1114 in FIG. 16).

In other words, no TA value is typically included in the message #4 including identification information of a user equipment. In this embodiment, however, by including a TA value in a message #4, a UE 20 that ignores a TA #2 receive in a message #2 can apply the TA value in the message #4 as information for transmission timing adjustment, and start the TA timer 251.

Note that the UE 20 may store the TA #2 that is ignored in the memory 252, in this embodiment.

(1.4.4) Technique 1-4 (FIG. 17 to FIG. 20)

In a fourth technique, a UE 20 restarts the TA timer 251 in response to receiving a message #2, irregardless whether the UE 20 stores a TA value (TA #2) received in a message #2 from the eNB 10, as illustrated in FIG. 17 to FIG. 20.

Figure 20:
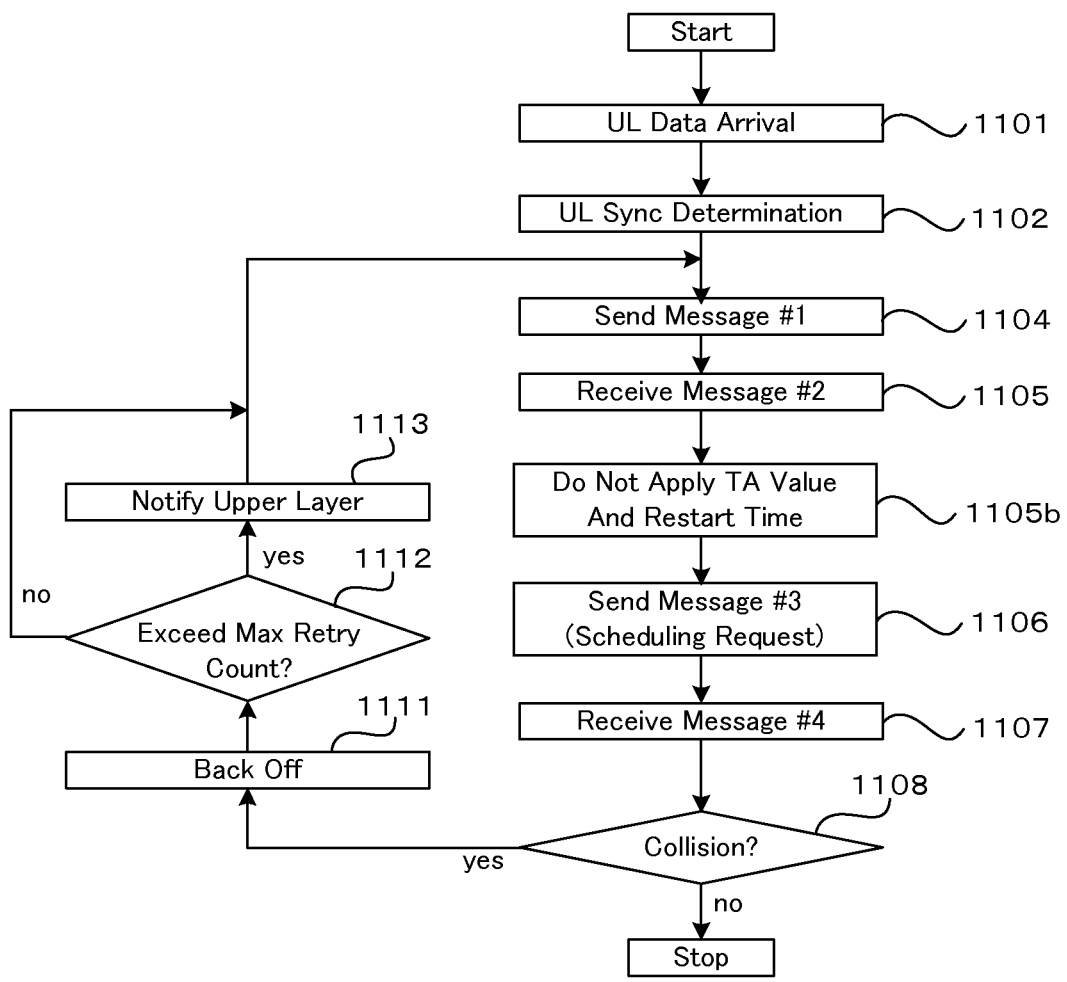
FIG. 20 is a flowchart illustrating one example of a UL communication control (technique 1-4) by a UE according to a first embodiment.

In this case, the UE 20 can continue to apply a TA value received from the eNB 10 (TA #1) in a subsequent RA (UL transmissions) before starting a RA procedure (Processing 1105b in FIG. 20). In other words, the UE 20 can control the TA timer 251 such that the valid term of UL transmission timing received in a TA command from the eNB 10 before the RA is started, is extended during an RA.

That is, the UE 20 continue to apply the TA #1 without applying a TA #2 and extends the valid term of the TA #1 after receiving the TA #2 during the RA while performing the RA to the eNB 10 based on the TA #1.

At this time, the extension period (the value of the TA timer 251) may be a default value, or may be set based on the timing of receiving the message #2. For example, the value of the TA timer 251 may be set by subtracting the time difference between when the message #2 is received and when the TA #1 is timed out, for UL synchronization.

In accordance with the embodiment, the TA #1 can still be used after receiving the a TA #2 and can be applied for transmission timing adjustment.

(1.5) Case in which a contention with other UE(s) 20 occurs when a message #4 is received A contention with other UE(s) 20 at the time when a message #4 is received means that the same UL resource is also used by the other UE(s) 20, and that a unique UL resource cannot be reserved for the local terminal 20.

Therefore, since the UE 20 cannot perform UL data transmission via other routes than an RACH, the UE 20 retries to perform a contention-based RA to establish UL synchronization ("yes" route in Processing 1108 in FIG. 3).

(2) Second Embodiment

The first embodiment described above assumes the case in which a TA timer 251 in a UE 20 is timed out until a message

4 is received from the eNB 10 after the UE 20 sends a message #3. This embodiment assumes the case in which a TA timer 251 in a UE 20 is timed out until a message #3 is sent to the eNB 10 after the UE 20 receives a message #2 from the eNB 10.

For example, as illustrated in FIG. 21 to FIG. 23, FIG. 25 to FIG. 27 and FIG. 30 to FIG. 32, a contention-based RA (transmission of the message #1: Processing 1011) is performed once DL data addressed to the UE 20 arrives at the eNB 10 and the UE 20 receives an incoming notification (Processing 1010). In this case, if the UE 20 that receives a TA value (TA #2) in the message #2 from the eNB 10 ignores the TA #2, the TA timer 251 may be timed out until a message #3 (signal including an S-TMSI as one example of identification information of the UE 20) is sent.

In such a case, the UE 20 (the UL synchronization determination unit 24) determines that synchronization has been lost, and continues the RA using one of the following techniques 2-1 to 2-4.

(2.1) Technique 2-1 (FIG. 21 to FIG. 24)

When a UE 20 determines that synchronization has been lost, the UE 20 cannot, in principle, transmit a message #3. However, the TA timer 251 is often times set within a fail-safe range within which synchronization on the physical layer is not lost. Accordingly, there may be cases in which actual UL synchronization (on a lower layer) is established even if the TA timer 251 is timed out.

Figure 21:
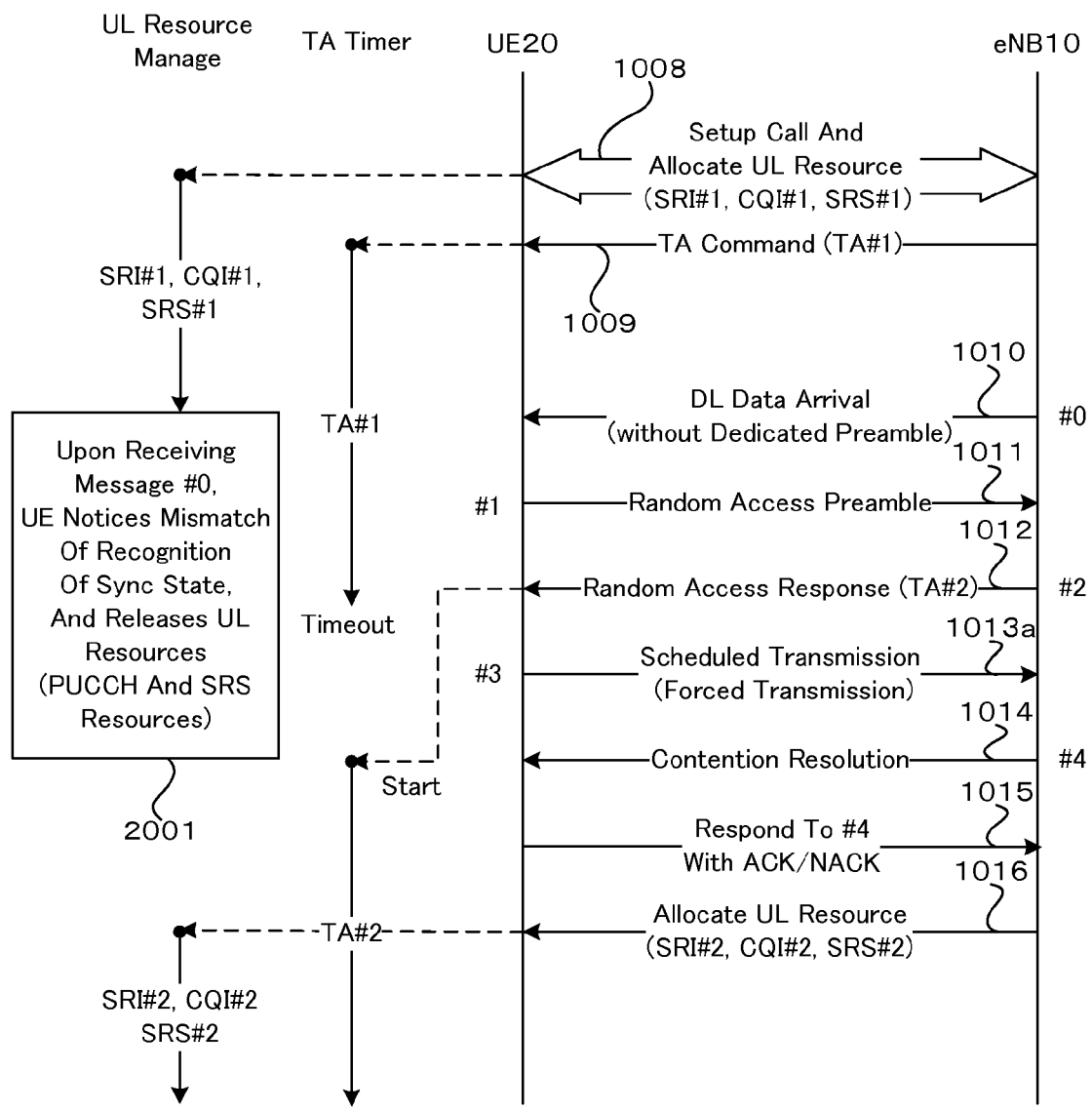
FIG. 21 is a sequence diagram illustrating one example of a UL communication control (technique 2-1) according to a second embodiment.
Figure 22:
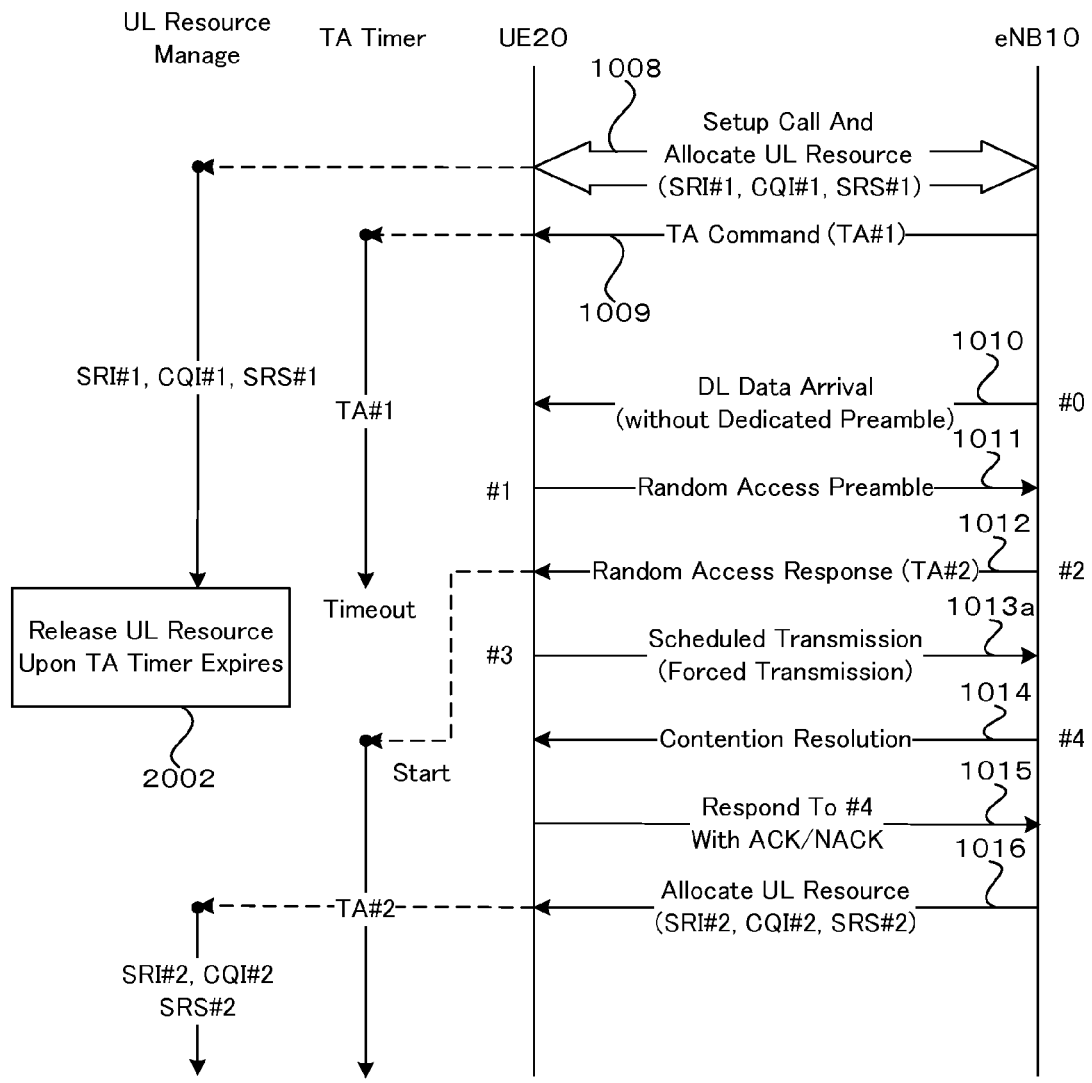
FIG. 22 is a sequence diagram illustrating another example of a UL communication control (technique 2-1) according to the second embodiment.
Figure 23:
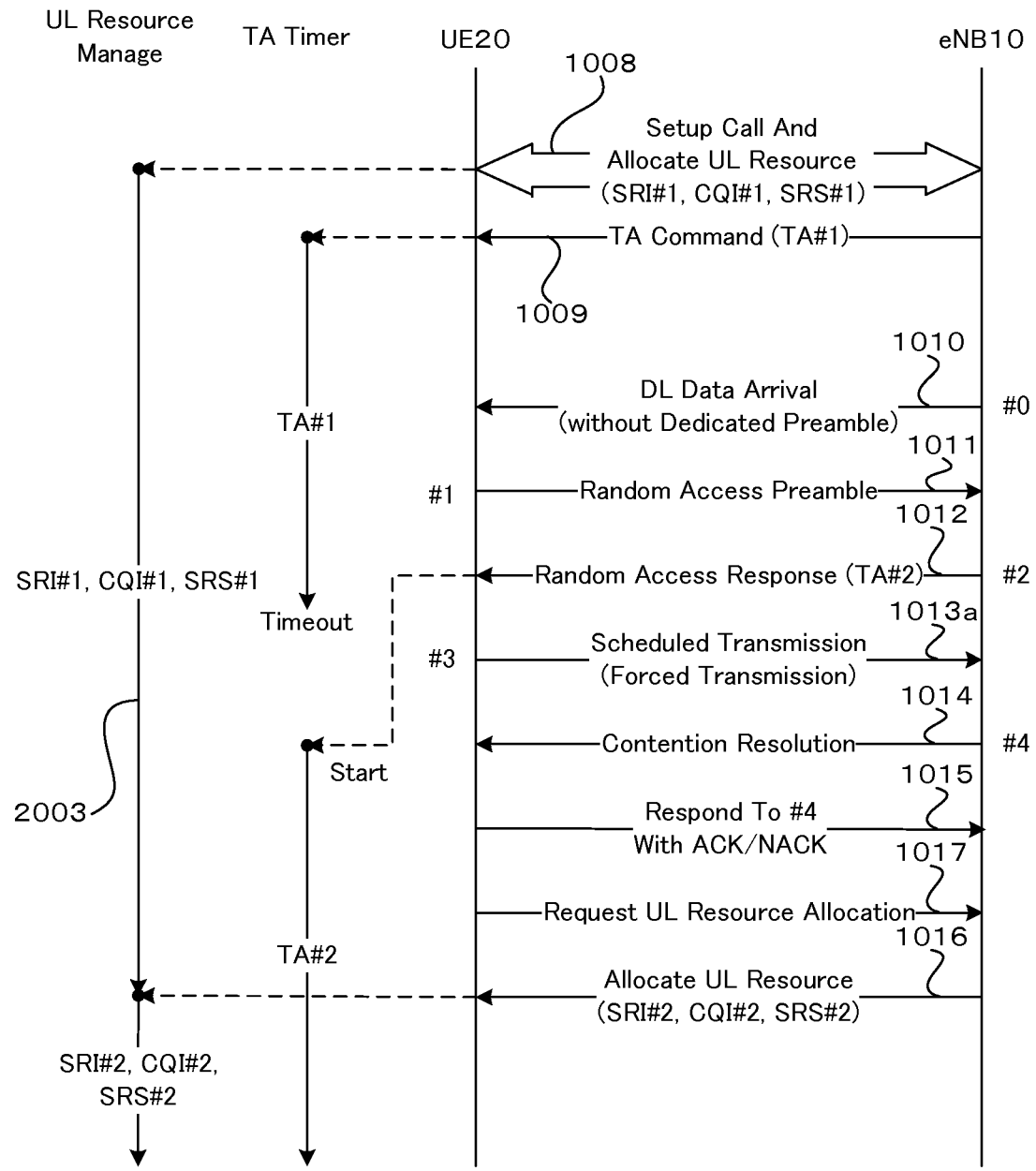
FIG. 23 is a sequence diagram illustrating another example of a UL communication control (technique 2-1) according to the second embodiment.
Figure 24:
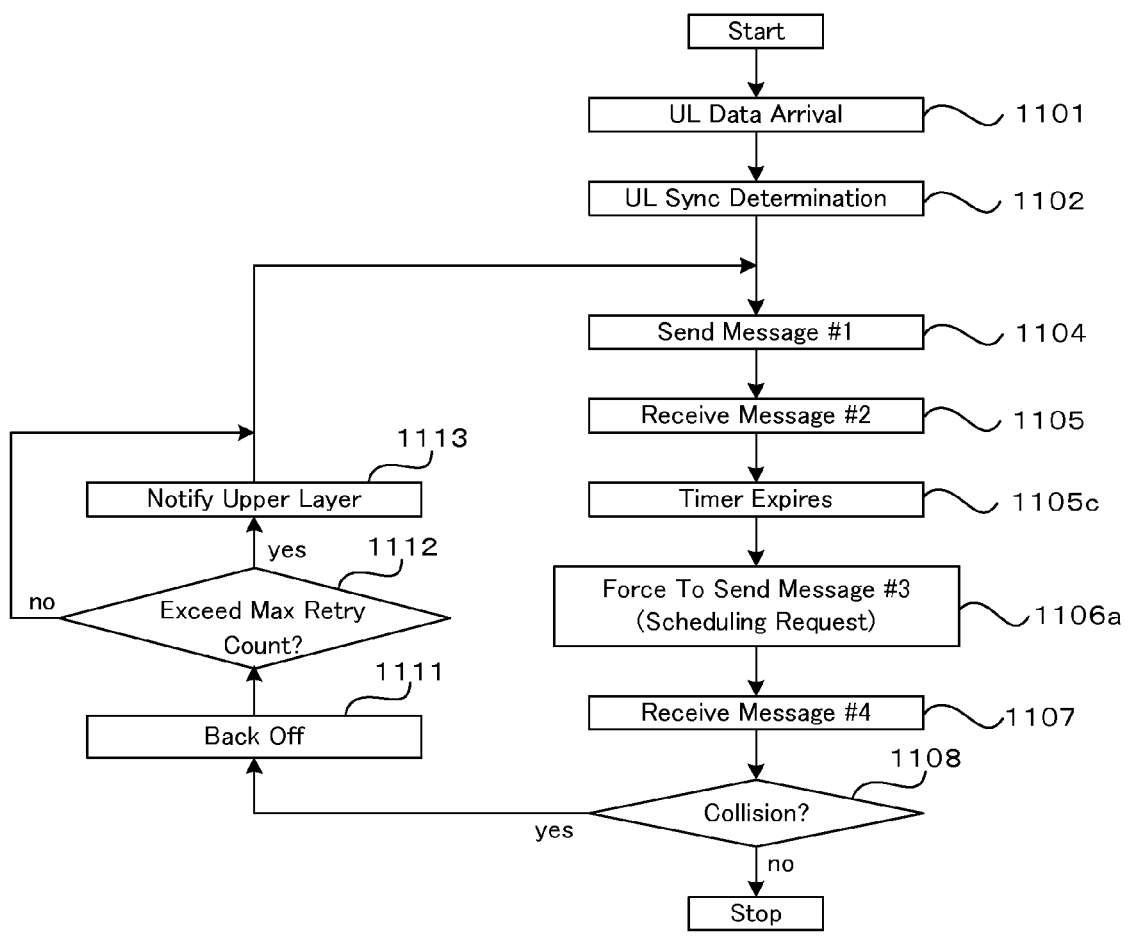
FIG. 24 is a flowchart illustrating one example of a UL communication control (technique 2-1) by a UE according to the second embodiment.

For this reason, in this embodiment, even if a TA timer 251 is timed out after a UE 20 receives a message #2 from the eNB 10 (Processing 1012), the UE 20 retries to send a message #3 to the eNB 10 (forced transmission) (Processing 1013a in FIG. 21 to FIG. 23, Processing 1105c in FIG. 24, and Processing 1106a). In other words, even if the timer is timed out, the UE 20 can apply a TA #1 to send a message #3. The TA #2 is stored in the memory 252.

More specifically, the valid term of a TA #1 expires during an RA before transmission processing for a message #3 is performed while performing the RA to the eNB 10 based on the TA #1, the UE 20 can performs transmission processing of the message #3 to the eNB 10 based on the TA #1 even if a TA #2 is received before the expiration of the valid term of the TA #1.

Thereby, the UE 20 can continue the RA procedure without starting a contention-based RA from the beginning, as long as the message #3 is received by the eNB 10. In other words, the UE 20 can apply the TA #2 to transmission timing adjustment for future transmission processing and start the TA timer 251 if the UE 20 succeeds in receiving, as a response signal to the message #3, a message #4 containing identification information of the UE 20. Accordingly, it is possible to shorten the delay until UL data transmission is started.

Since the eNB 10 can recognize that the UE 20 sent the message #3 forcefully, the eNB 10 can send a connection rejection message in a message #4 to the UE 20. More specifically, the eNB 10 can send a rejection message to the UE 20 if receiving a message #3 sent from the UE 20 based on the TA #1 after the valid term of the TA #1 expires.

In this case, the UE 20 performs selection or reselection of a cell, or retries an RA procedure. Alternatively, the eNB 10 may not send a message #4 intentionally. In this case, the UE 20 retries transmission of a message #3 until an allowable retry count (general maximum retry count, or a maximum retry count that is exclusively applied to this case).

(2.2) Technique 2-2 (FIG. 25 to FIG. 28)

Figure 25:
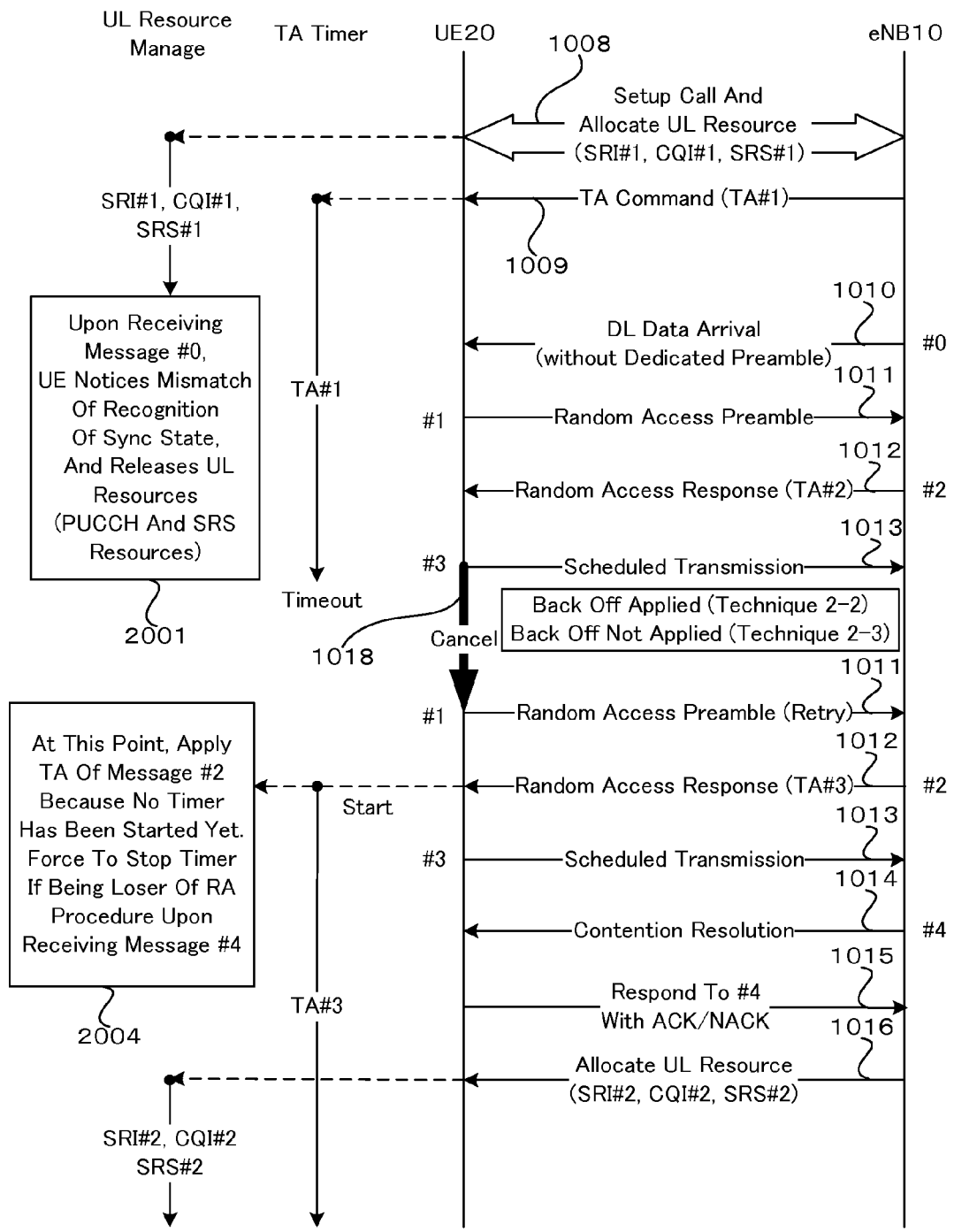
FIG. 25 is a sequence diagram illustrating one example of a UL communication control (techniques 2-2 and 2-3) according to the second embodiment.
Figure 26:
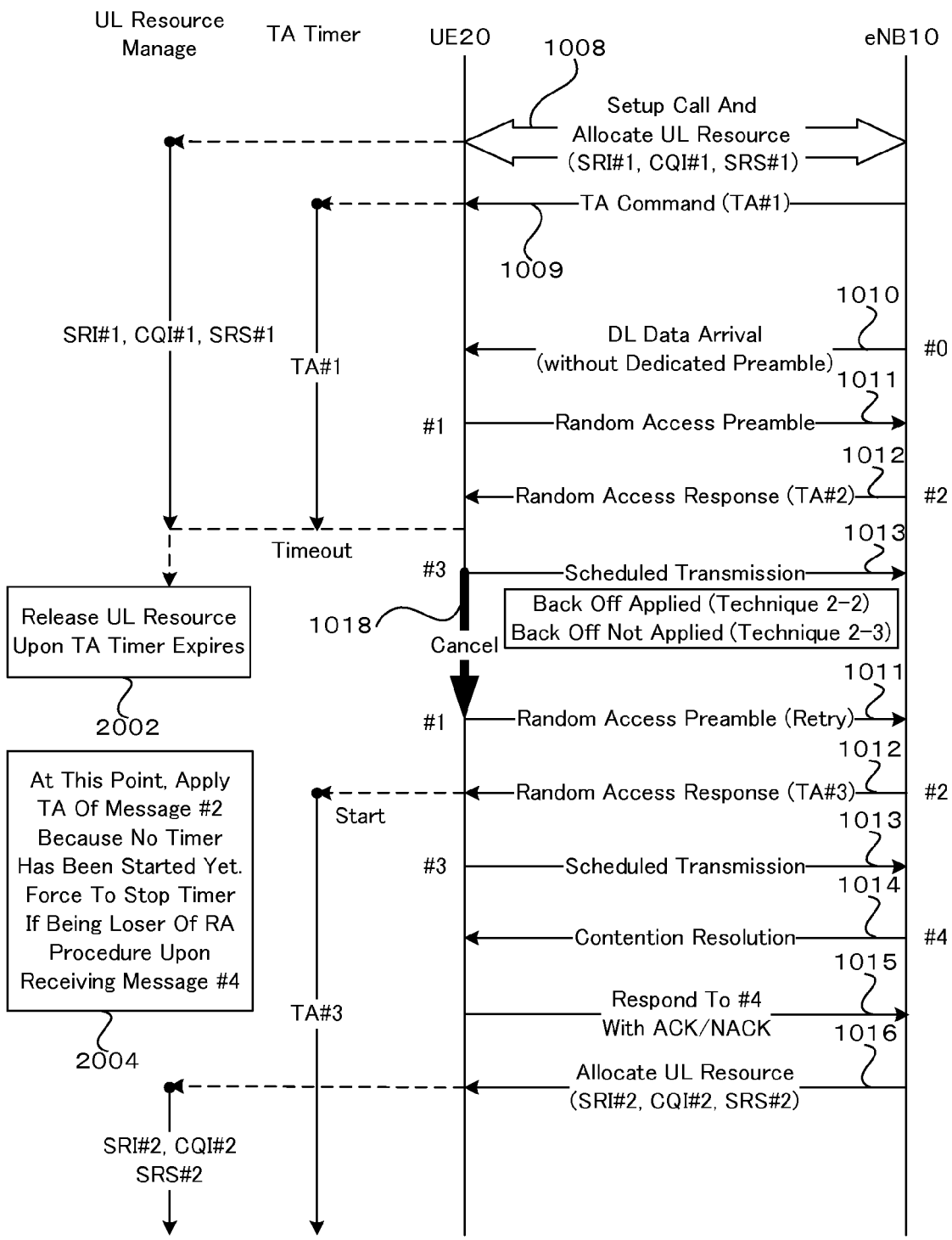
FIG. 26 is a sequence diagram illustrating another example of a UL communication control (techniques 2-2 and 2-3) according to the second embodiment.
Figure 27:
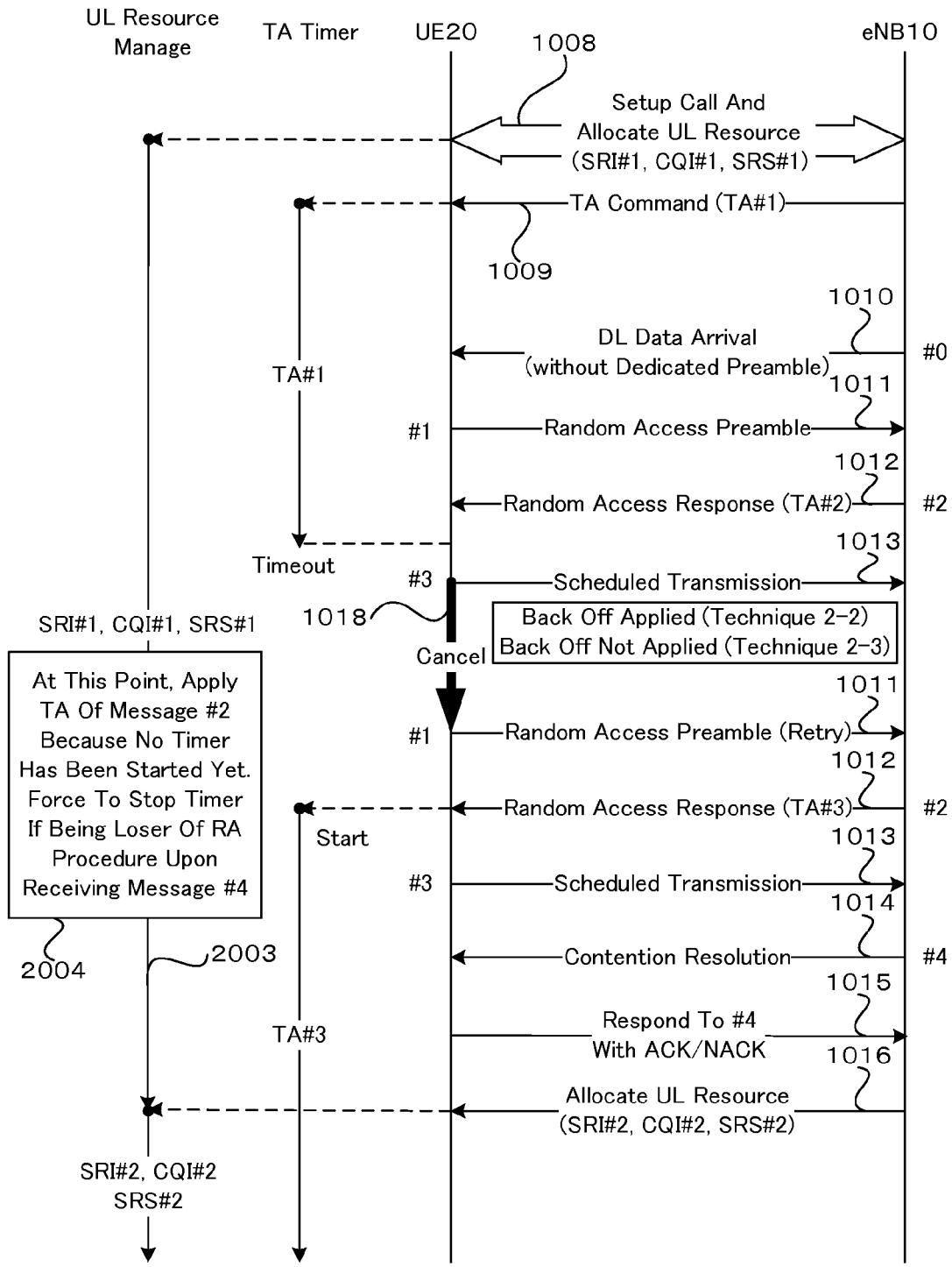
FIG. 27 is a sequence diagram illustrating another example of a UL communication control (techniques 2-2 and 2-3) according to the second embodiment.

As illustrated in FIG. 25 to FIG. 27, if the TA timer 251 expires before sending a message #3 to the eNB 10 (Processing 1013) after receiving a message #2 (TA #2) (Processing 1013), an UE 20 cancels the transmission of a message #3 and aborts (cancels a contention-based RA procedure that is being performed (Processing 1018).

In other words, if the valid term of the TA #1 expires during an RA before the UE 20 performs transmission processing of a signal including an S-TMSI as one example of identification information of the UE 20 while performing the RA to the eNB 10 based on the TA #1, the UE 20 aborts the RA, despite a TA #2 is received before the valid term of the TA #1 expires.

Figure 28:
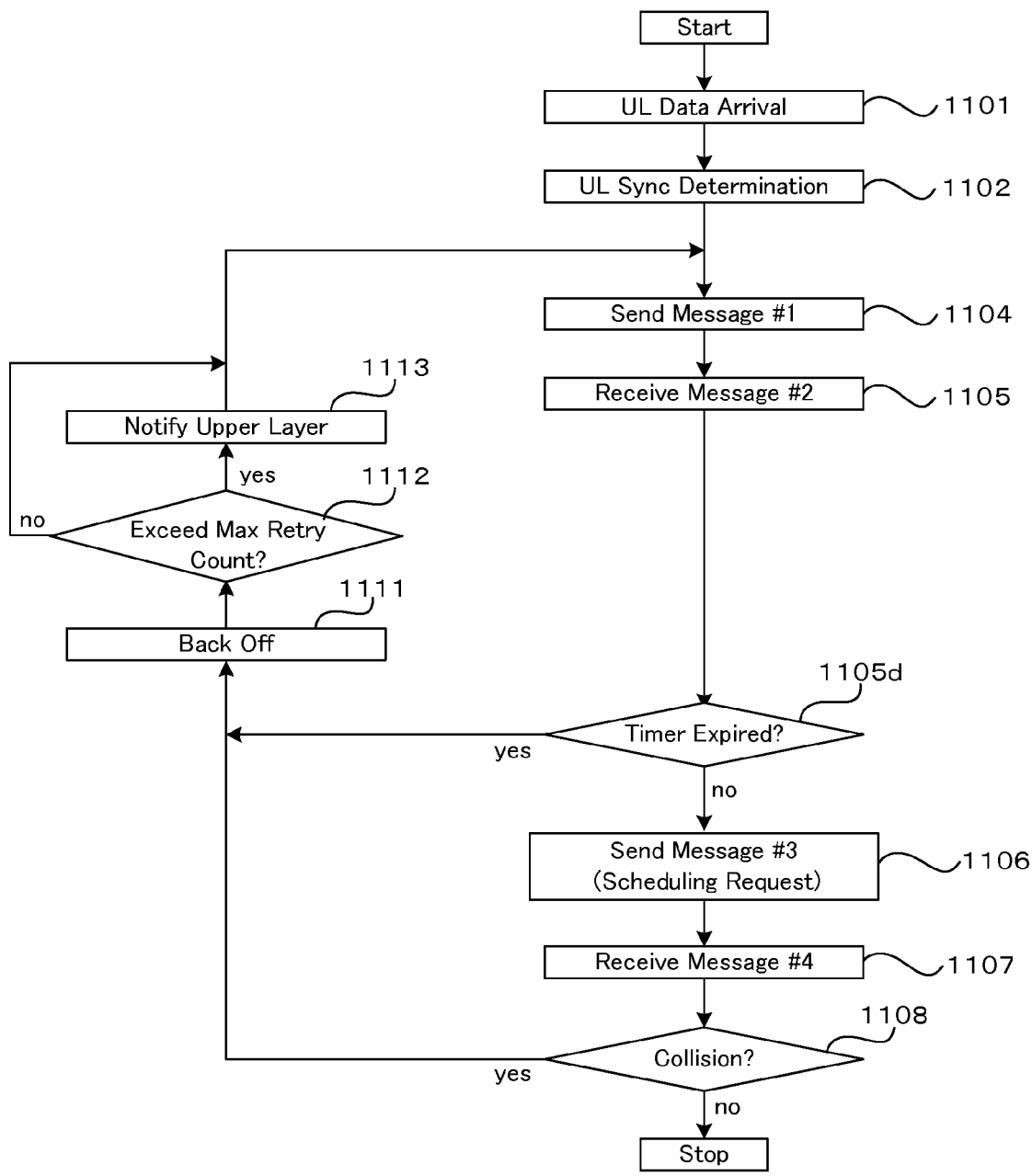
FIG. 28 is a flowchart illustrating one example of a UL communication control (technique 2-2) by a UE according to the second embodiment.

In this case, the UE 20 applies backoff and retries a contention-based RA, as illustrated in FIG. 28 ("yes" route in Processing 1105d). In other words, an RA is retried at the timing based on the backoff time (waiting time period information) received from the eNB 10 during the aborted RA. The UE 20 sends a message #1 (Processing 1011), receives a message #2 (TA #3) (Processing 1012), and so on, as illustrated in FIG. 25 to FIG. 27.

In this flow, the TA timer 251 is timed out (is not started yet) at the time when the message #2 (TA #2) is received. Accordingly, the UE 20 can apply a new TA #3 that is receive in a message #2 during a retried RA to transmission timing adjustment of subsequent UL transmissions, and start the TA timer 251. If the UE 20 knows that it is a loser in a RA (a collision occurs) upon receiving a message #4, the TA timer 251 may be forcefully terminated (Processing 2004 in FIG. 25 to FIG. 27).

By aborting an RA procedure and retry an RA when the TA timer 251 is timed out, as in this embodiment, a delay until a UL data transmission is stated can be shortened than in the case in which the entire remaining procedure (transmission of a message #3 and reception of message #4, for example) is performed.

(2.3) Technique 2-3 (FIG. 25 to FIG. 27, FIG. 29)

Figure 29:
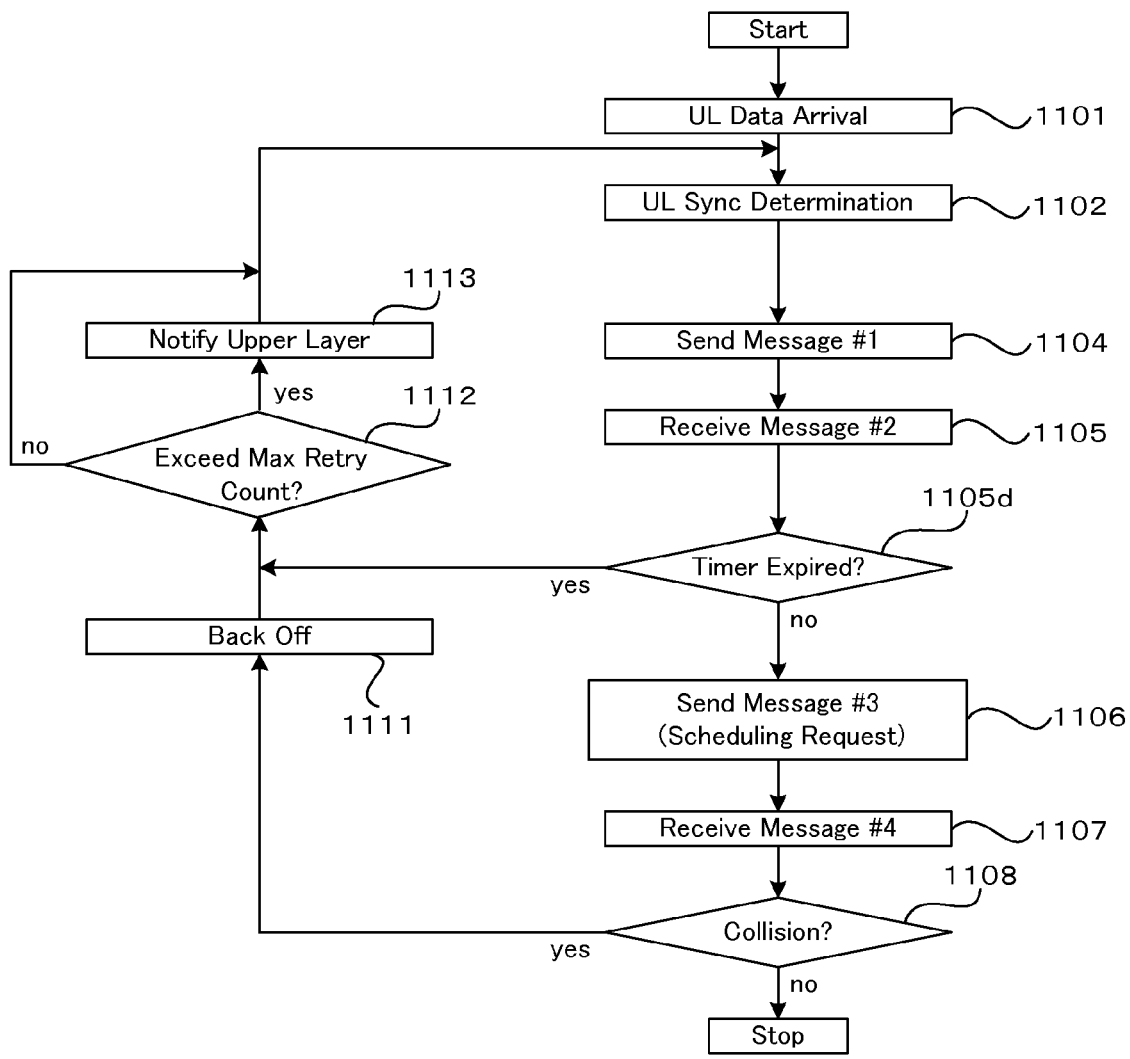
FIG. 29 is a flowchart illustrating one example of a UL communication control (technique 2-3) by a UE according to the second embodiment.

If a contention-based RA is retried after the TA timer 251 is timed out, the UE 20 may retry an RA without applying the backoff, as illustrated in FIG. 29 ("yes" route of Processing 1105d).

In other words, the UE 20 can retry an RA, without applying the backoff time received from the eNB 10 during the aborted RA. Without applying the backoff, it is possible to shorten the delay time until a UL data transmission is started, as compared to the case the backoff is applied.

(2.4) Technique 2-4 (FIG. 30 to FIG. 33)

Figure 30:
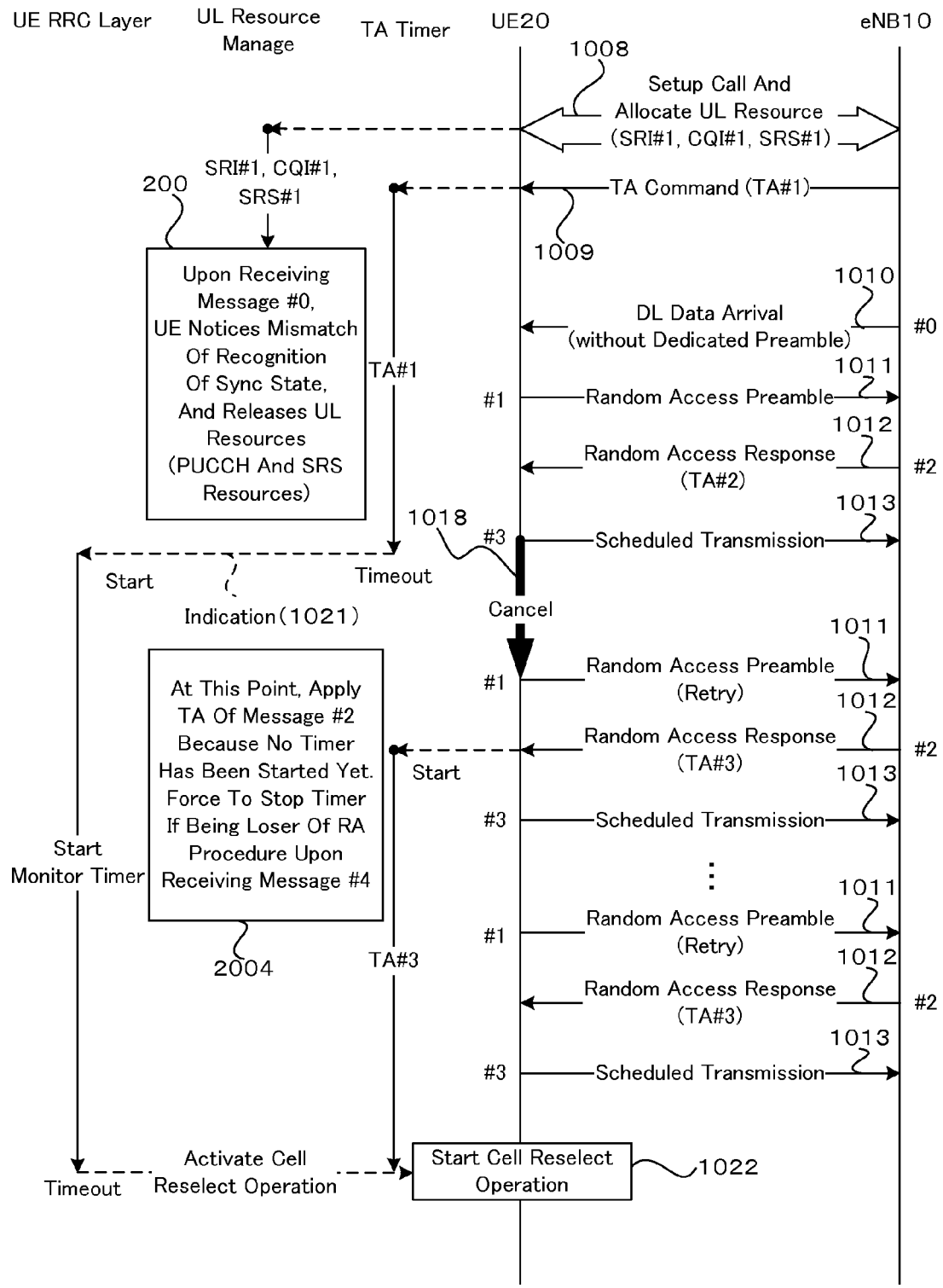
FIG. 30 is a sequence diagram illustrating one example of a UL communication control (technique 2-4) according to the second embodiment.
Figure 31:
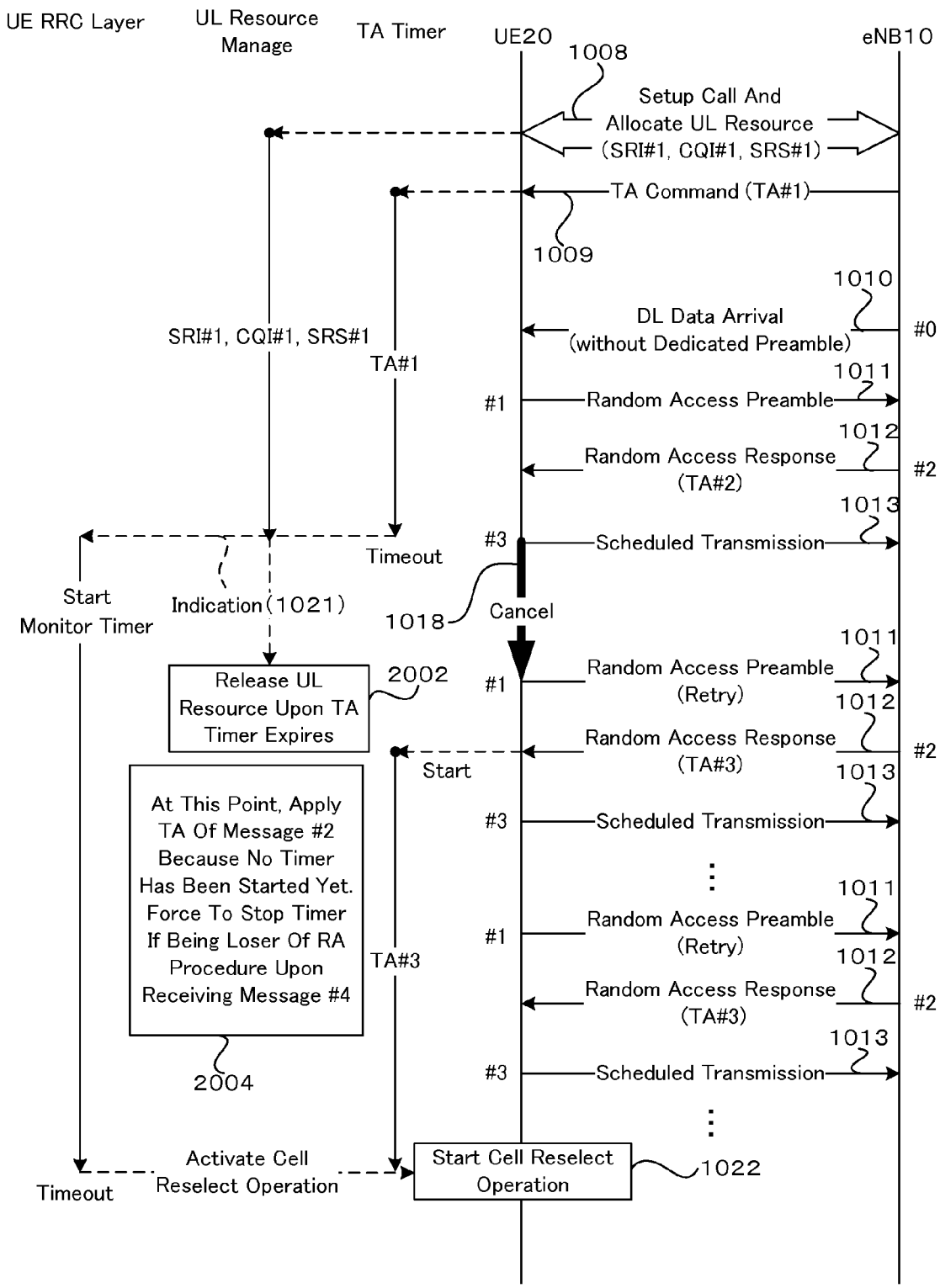
FIG. 31 is a sequence diagram illustrating another example of a UL communication control (technique 2-4) according to the second embodiment.
Figure 32:
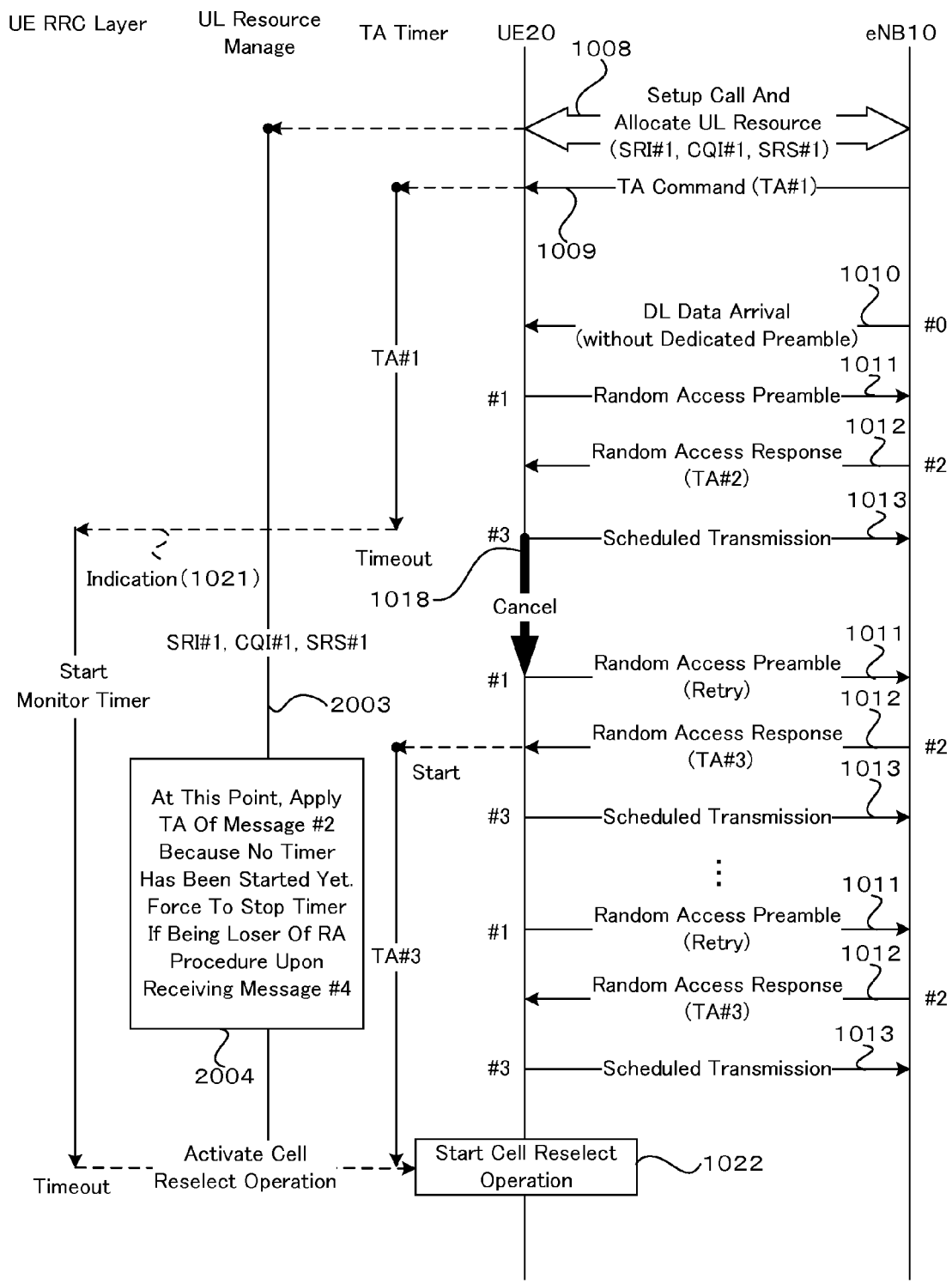
FIG. 32 is a sequence diagram illustrating another example of a UL communication control (technique 2-4) according to the second embodiment.
Figure 33:
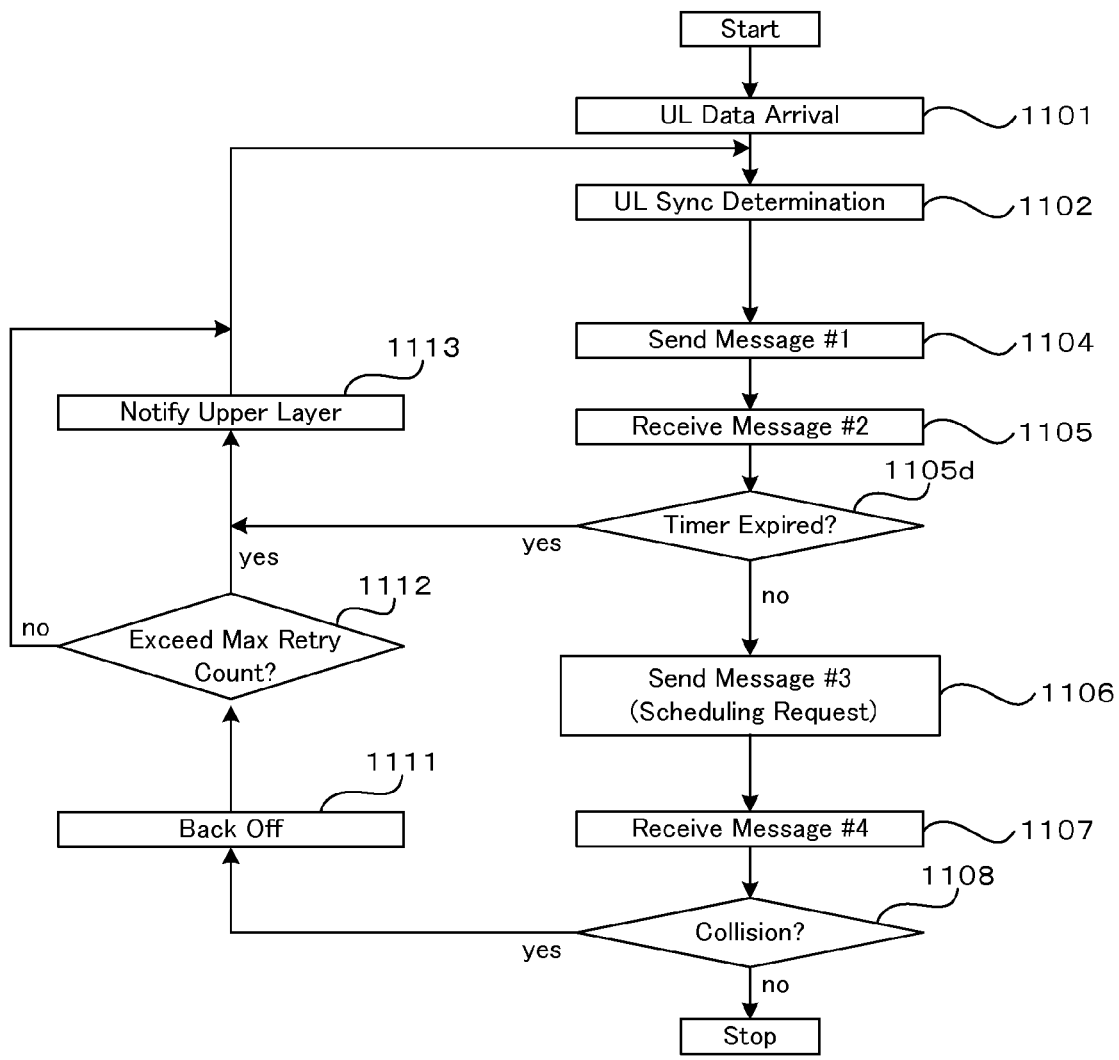
FIG. 33 is a flowchart illustrating one example of a UL communication control (technique 2-4) by a UE according to the second embodiment.

In addition, as illustrated in FIG. 30 to FIG. 32, when the TA timer 251 is timed out, the UE 20 may notify an upper layer (for example, an RRC layer), irrespective whether the backoff is applied (Processing 1021, the "yes" route of Processing 1105d to Processing 1113 in FIG. 33).

This enable the upper layer of the UE 20 to start a monitor timer of an RA and monitor whether the RA procedure is continued (retried). In other words, the UE 20 monitors the RA whether the TA timer 251 is timed out (whether the valid term of the TA #1 expires). In response to the monitor timer being timed out during the RA, the upper layer of the UE 20 performs a cell selection or cell reselection processing (Processing 1022 in FIG. 30 to FIG. 32).

Accordingly, the UE 20 can initiate an RA with another cell (eNB 10) earlier, and it is possible to reduce the time delay until a UL data transmission is started. Note that monitor of an RA by the upper layer whether the TA timer 251 is timed out may also be used in the above-described techniques 2-1 to 2-3.

(3) Third Embodiment

Next, this embodiment assumes the case in which the eNB 10 can correctly manage the timer value of a TA timer 251 in a UE 20 (the TA timers 151 and 251 of the eNB 10 and the UE 20 are synchronized). In this case, since the eNB 10 can recognize that the TA timer 251 in the UE 20 still works, the UE 20 can trust the TA value received from the eNB 10. In addition, unlike in the first and second embodiments, a TA value may be advantageously sent from the eNB 10.

In response to arrival of DL data addressed to a UE 20 at the eNB 10 after the UE 20 completes to send UL data based on the TA value receive in the TA command, the eNB 10 sends an incoming notification to the UE 20 (sends a message #0).

Thereby, the UE 20 receiving the incoming notification starts a contention-based RA procedure. Thereafter, if the TA timer 251 in the UE 20 is timed out between when a message #2 is received (Processing 1012) and when a message #3 is sent (Processing 1013), the UE 20 tries to establish UL synchronization using tone of the following four techniques 3-1 to 3-3.

(3.1) Technique 3-1

Similar to the technique 1-2 (FIG. 9 to FIG. 12) that has been described with reference to the first embodiment, an UE 20 stores, in the memory 252, a TA value received from the eNB 10 in a the message #2 during an RA procedure. When the TA timer 251 is timed out before sending a the message #3 to the eNB 10, the UE 20 applies the TA value stored in the memory 252 to UL transmission, and starts the TA timer 251.

(3.2) Technique 3-2

An UE 20 performs one of the techniques 2-1 to 2-4 that have been described with reference to the second embodiment.

(3.3) Technique 3-3 (FIG. 34 to FIG. 37)

Figure 34:
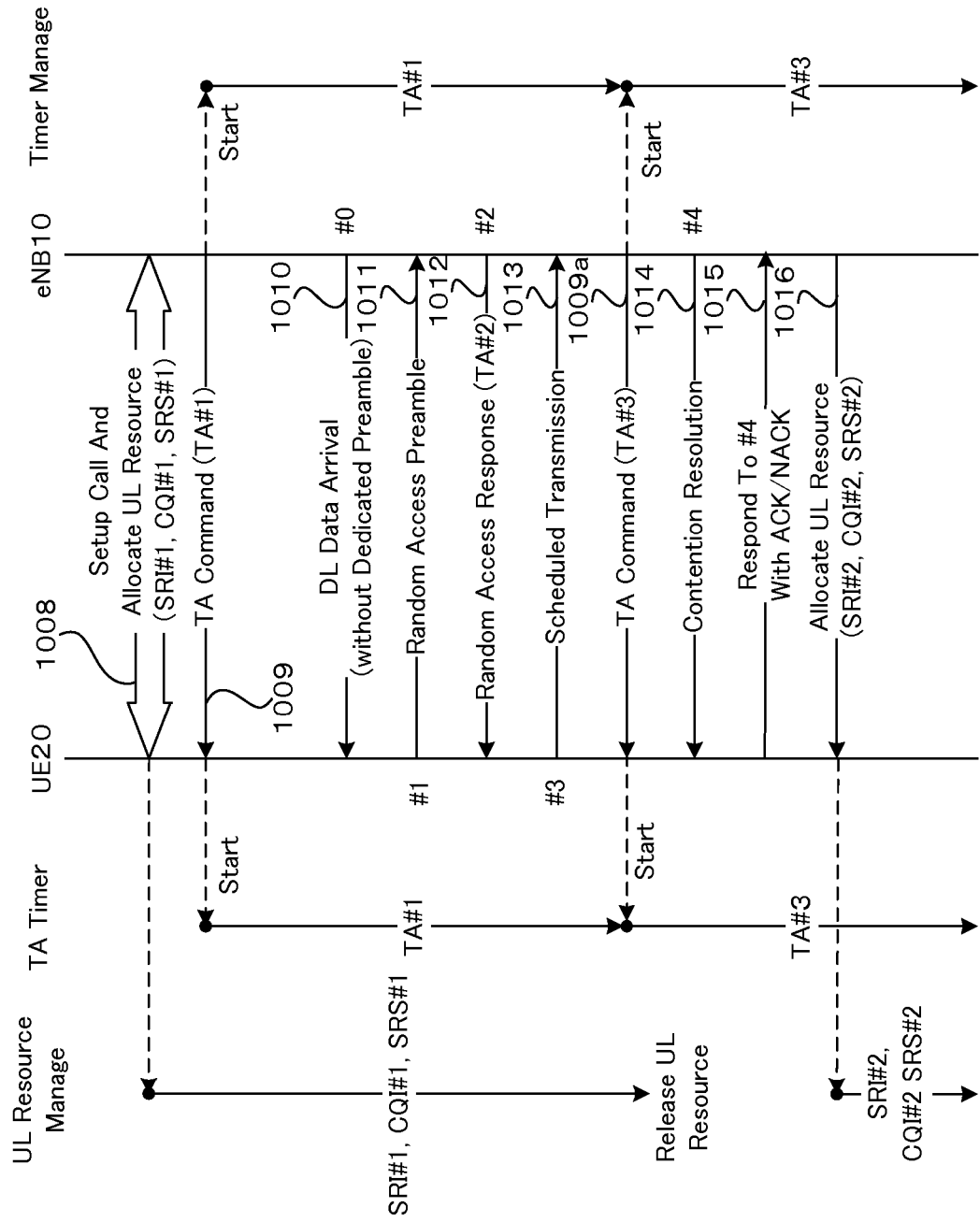
FIG. 34 is a sequence diagram illustrating one example of a UL communication control (technique 3-3) according to a third embodiment.
Figure 35:
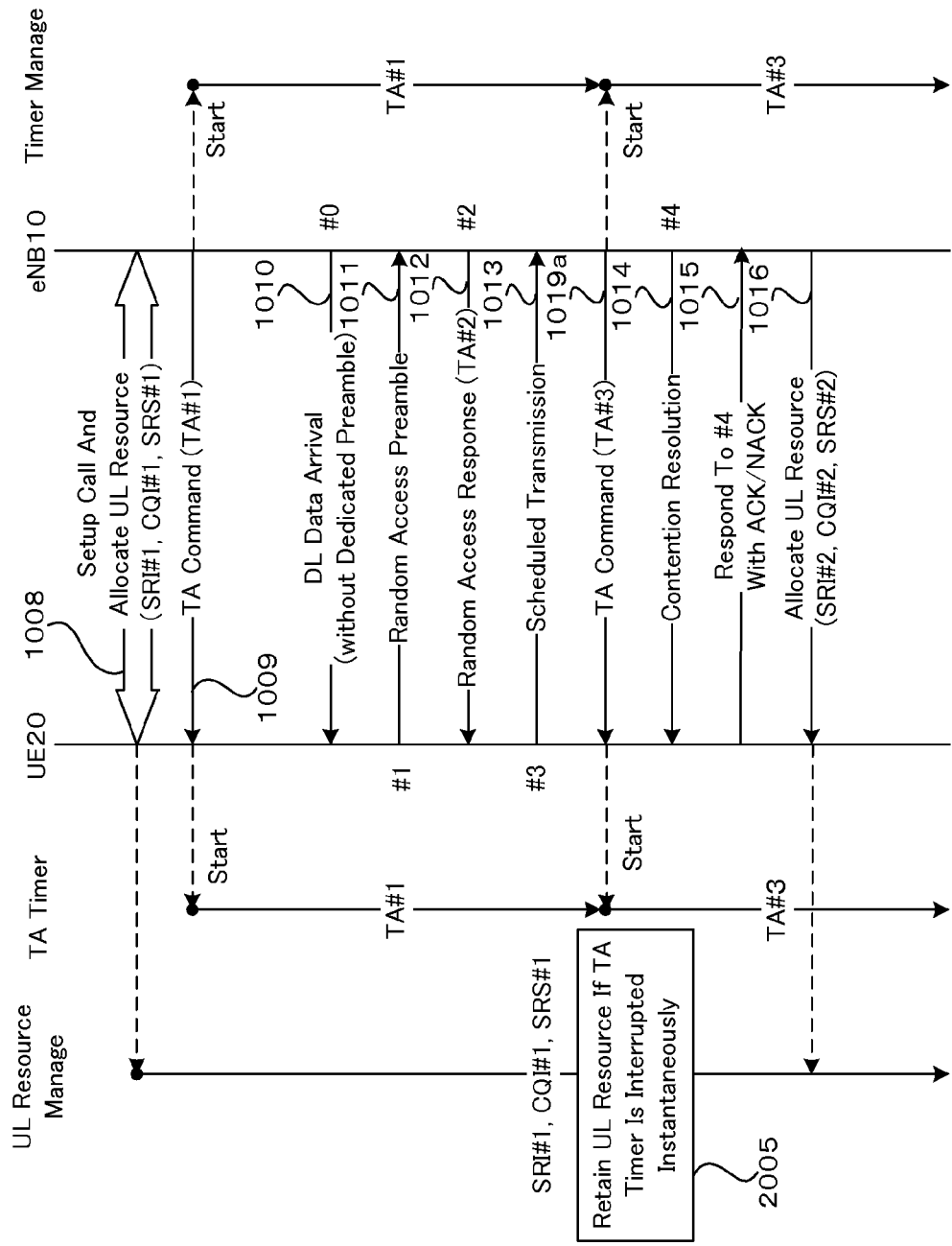
FIG. 35 is a sequence diagram illustrating another example of a UL communication control (technique 3-3) according to the third embodiment.

As illustrated in FIG. 34 and FIG. 35, a UE 20 sends a signal (the message #3) including an S-TMSI as one example of identification information of the UE 20 during an RA while performing the RA to the eNB 10 based on the TA #1 (Processing 1013).

Figure 36:
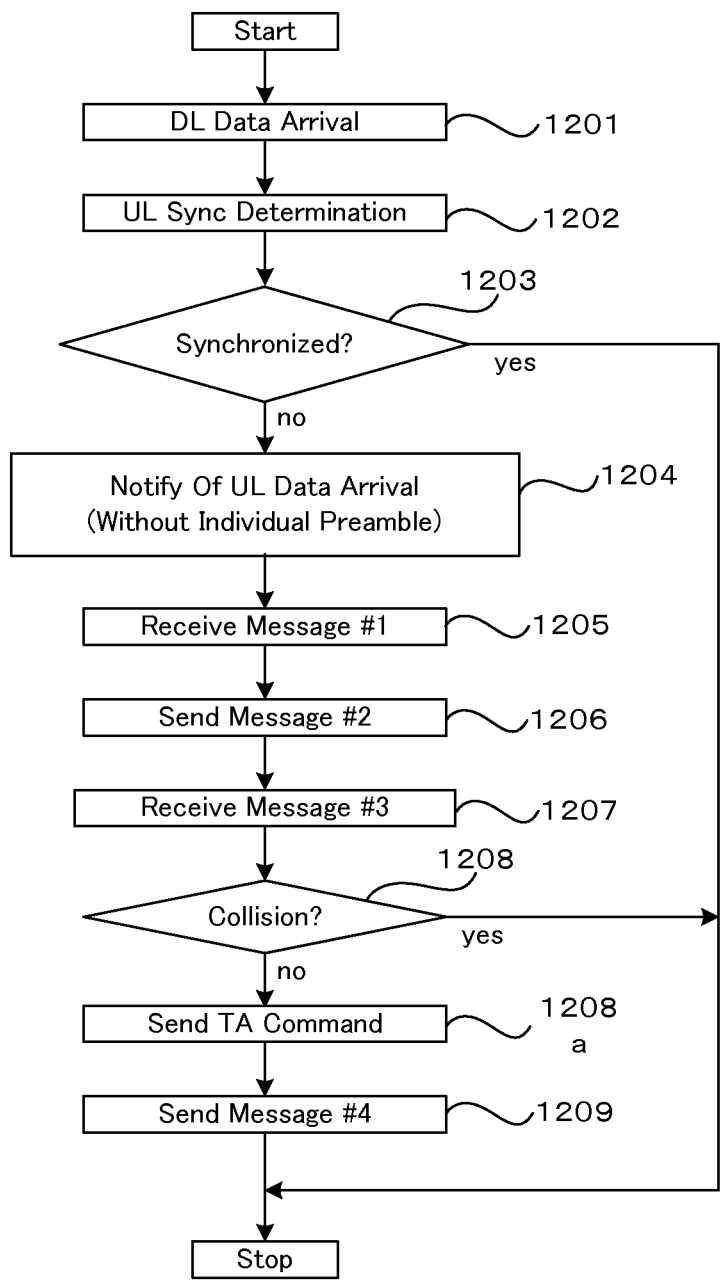
FIG. 36 is a flowchart illustrating one example of a UL communication control (technique 3-3) by an eNB according to the third embodiment.
Figure 37:
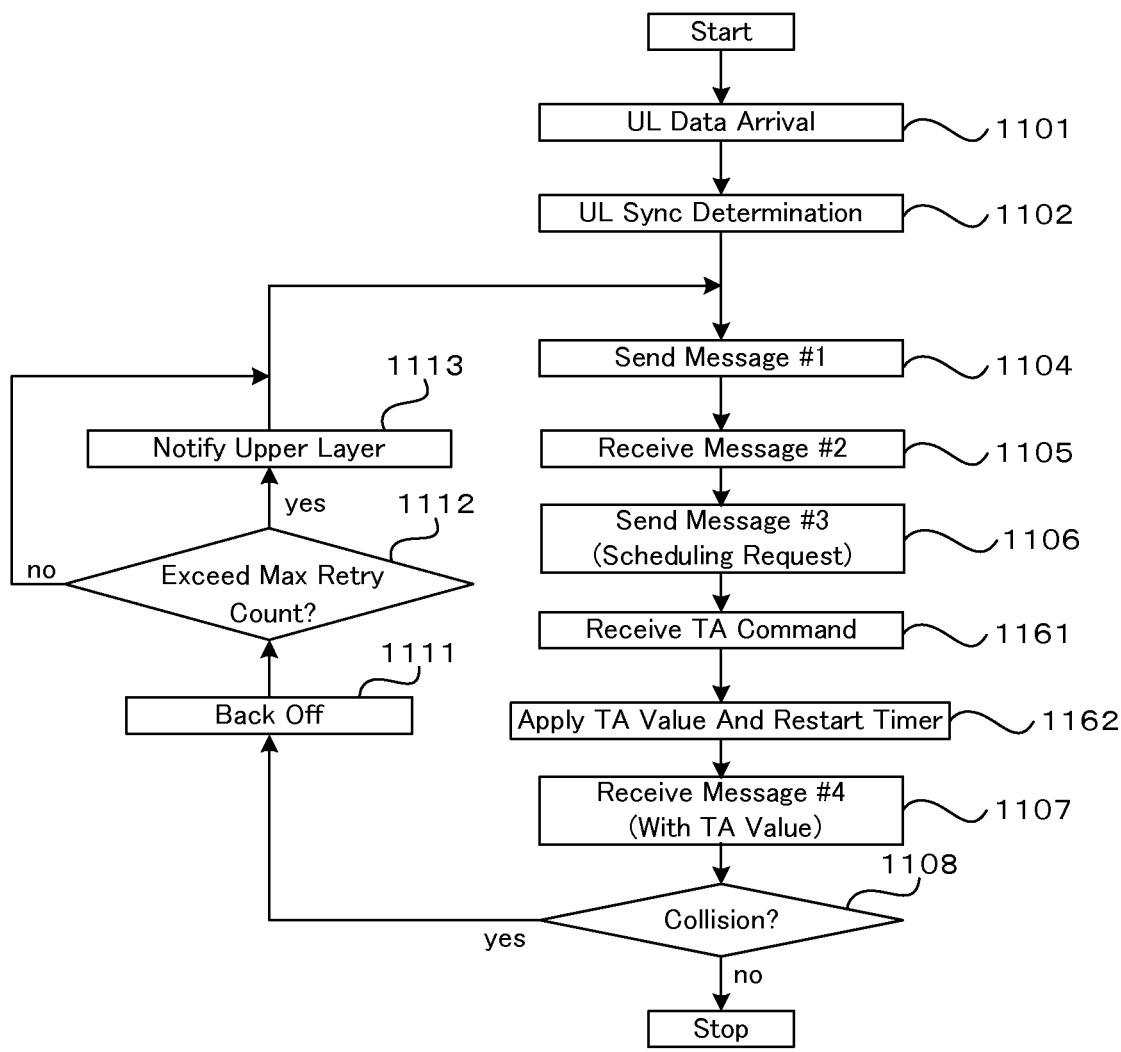
FIG. 37 is a flowchart illustrating one example of a UL communication control (technique 3-3) by a UE according to the third embodiment.

In response to receiving the message #3 from the UE 20 RA before the TA timer 251 in the UE 20 is timed out (Processing 1013), the eNB 10 sends a TA command including a new TA value (TA #3; second timing adjustment information) to the UE 20 (Processing 1009a, Processing 1208a in FIG. 36).

The UE 20 monitors (polls) whether a TA command is received even during execution of the RA. For example, the UE 20 monitors whether a TA command is received from the eNB 10 after sending the message #3 to the eNB 10 (Processing 1013). In response to receiving a TA command from the eNB 10 while monitoring (Processing 1009a, and Processing 1161 in FIG. 37), the UE 20 (the timer management unit 25) applies the TA value (TA #3) of the receive TA command to UL transmission, and starts the TA timer 251 (Processing 1162 in FIG. 37).

Note that UL resources are managed by the UE 20 in the manner similar to that of the first or second embodiment. For example, UL resources that have been reserved may be deallocated when incoming notification (the message #0) of DL data is received from the eNB 10, or when the TA timer 251 is timed out. In addition, even if the TA timer 251 is timed out before the TA #3 is received (when the valid term of the TA #1 is reached), it is also possible to maintain the UL resources that have been reserved (continue to use them), rather than deallocating them (Processing 2005 in FIG. 35).

In addition, the UE 20 can apply the same technique as in the first embodiment (one of the technique 1-1 to technique 1-4) when the TA timer is timed out between when sending a message #3 and when receiving a message #4.

Various inconveniences, which may occur during adjusting transmission timing from a base station to a terminal (user equipment), can be solved.

The delay time until a user equipment can initiate a communication after connecting to a base station can also be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A mobile communication system having user equipment that performs transmission process having transmission timing adjustment information and a base station that receives a signal sent from the user equipment, the mobile communication system comprising:
   when, during a connection process, a timer that is in accordance with first transmission timing adjustment information expires before the user equipment transmits a signal that includes identification information of the user equipment, the user equipment does not transmit the signal that includes the identification information of the user equipment, wherein the connection process includes reception of second transmission timing adjustment information while the user equipment contains the first transmission timing adjustment information, wherein the connection process connects the user equipment to the base station.

2. The mobile communication system according to claim 1, wherein the user equipment does not transmit the signal, if the timer in accordance with the first transmission timing adjustment information expires before transmission of the signal including the identification information of the user equipment and after reception of the second transmission timing adjustment information by the user equipment during the connection process while the user equipment has the first transmission timing adjustment information and performs the connection process to the base station.

3. A user equipment in a mobile communication system having the user equipment and a base station that receives a signal sent from the user equipment, the user equipment comprising:
   a transmitter configured to perform a transmission process on the base station based on transmission timing adjustment information; and
   a processor configured to:
   execute a connection process that connects to the base station; and
   when a timer that is in accordance with first transmission timing adjustment information expires before the user equipment transmits a signal that includes identification information of the user equipment, not transmit the signal that includes the identification information of the user equipment, wherein the connection process includes reception of second transmission timing adjustment information while containing the first transmission timing adjustment information.

4. A base station for receiving a signal sent from the user equipment as claimed in claim 3.

5. A timing adjustment method in a mobile communication system having user equipment that performs a transmission process based on transmission timing adjustment information and a base station that receives a signal sent from the user equipment, the timing adjustment method comprising:

when, during a connection process, a timer that is in accordance with first transmission timing adjustment information expires before the user equipment transmits a signal that includes identification information of the user equipment, not transmitting the signal that includes the identification information of the user equipment, wherein the connection process includes reception of second transmission timing adjustment information while the user equipment contains the first transmission timing adjustment information, wherein the connection process connects the user equipment to the base station.

* * * * *